(12) United States Patent
Boudreau

(10) Patent No.: US 11,267,661 B2
(45) Date of Patent: Mar. 8, 2022

(54) ROBOTIC PALLETIZING SYSTEM AND METHOD

(71) Applicant: PREMIER TECH TECHNOLOGIES LTÉE., Québec (CA)

(72) Inventor: Jean-Robert Boudreau, Québec (CA)

(73) Assignee: PREMIER TECH TECHNOLOGIES LTÉE, Quebec (CA)

( * ) Notice: Subject to any disclaimer, the term of this patent is extended or adjusted under 35 U.S.C. 154(b) by 128 days.

(21) Appl. No.: 16/480,354

(22) PCT Filed: Jan. 25, 2018

(86) PCT No.: PCT/CA2018/050088
§ 371 (c)(1),
(2) Date: Jul. 24, 2019

(87) PCT Pub. No.: WO2018/137033
PCT Pub. Date: Aug. 2, 2018

(65) Prior Publication Data
US 2019/0382220 A1    Dec. 19, 2019

Related U.S. Application Data

(60) Provisional application No. 62/450,748, filed on Jan. 26, 2017.

(51) Int. Cl.
*B65G 57/24* (2006.01)
*B65G 61/00* (2006.01)
(Continued)

(52) U.S. Cl.
CPC ............ *B65G 57/24* (2013.01); *B65B 11/045* (2013.01); *B65G 61/00* (2013.01);
(Continued)

(58) Field of Classification Search
CPC .............................. B65G 61/00; B65G 57/24; B65G 2811/0605; B65G 2811/061;
(Continued)

(56) References Cited

U.S. PATENT DOCUMENTS 4,995,224 A * 2/1991 Yourgalite ............ B65B 11/045
53/540
5,893,258 A * 4/1999 Lancaster, III ....... B65B 11/045
53/399
(Continued)

FOREIGN PATENT DOCUMENTS

DE       102009014950 A1    10/2010
DE     20 2014 009 735 U1    1/2016
(Continued)

OTHER PUBLICATIONS

Premier Tech Systems and Automation, "Robotic Case Packer packing bags in boxes (AR-200 Series)", May 21, 2010 (May 21, 2010), retrieved from YouTube on May 20, 2021, https://youtu.be/HI3V9d51aiM (Year: 2010).*

(Continued)

*Primary Examiner* — Khoi H Tran
*Assistant Examiner* — Tanner L Cullen
(74) *Attorney, Agent, or Firm* — BakerHostetler

(57) ABSTRACT

A robotic palletizer system and method include selectively operating a palletizing robot between at least a pregrouping state, in which the palletizing robot groups to-be-grouped items at a pregrouping station, and a principal grouping state, in which the palletizing robot groups to-be-grouped items at a principal grouping station. The system and method further include selectively operating a load securing machine between a securing state, in which the load securing machine at least partially secures to be grouped items grouped at the principal grouping station, and a non-opera- (Continued)

tional state. The palletizing robot can be operated in the pregrouping state during at least a portion of a time interval during which the load securing machine is operating in the securing state to secure the to-be-grouped items grouped at the principal grouping station.

29 Claims, 24 Drawing Sheets

(51) Int. Cl.
- *G05B 19/418* (2006.01)
- *B65B 11/04* (2006.01)
- *G06Q 10/08* (2012.01)
- *G05D 1/10* (2006.01)

(52) U.S. Cl.
CPC ..... *G05B 19/4187* (2013.01); *G05B 19/4189* (2013.01); *G05D 1/10* (2013.01); *G06Q 10/087* (2013.01)

(58) Field of Classification Search
CPC ... B65B 11/045; B65B 35/50; G05B 19/4189; G05B 2219/31049; G05B 2219/40006; B25J 9/1687
See application file for complete search history.

(56) References Cited

U.S. PATENT DOCUMENTS

| | | |
|---|---|---|
| 8,240,973 B2 | 8/2012 | Xu et al. |
| 8,240,983 B2 | 8/2012 | Suljak, Jr. et al. |
| 9,089,969 B1 | 7/2015 | Theobald |
| 2004/0220694 A1* | 11/2004 | Stingel, III .......... B65G 1/0464 700/216 |
| 2005/0125101 A1* | 6/2005 | Brust .................... B07C 5/10 700/245 |
| 2006/0182545 A1 | 8/2006 | Ray et al. |
| 2010/0146907 A1* | 6/2010 | Fritzsche ............. B65G 57/035 53/147 |
| 2010/0198394 A1* | 8/2010 | Trygg ................. B65G 47/086 700/218 |
| 2010/0316480 A1 | 12/2010 | Perl |
| 2012/0297733 A1* | 11/2012 | Pierson .................. B65B 35/50 53/447 |
| 2015/0073589 A1 | 3/2015 | Khodl et al. |
| 2016/0039550 A1* | 2/2016 | Boudreau .............. B65B 35/36 53/446 |
| 2016/0280475 A1* | 9/2016 | Kollmuss ............... B65G 57/03 |

FOREIGN PATENT DOCUMENTS

| | | |
|---|---|---|
| WO | 2005105577 A1 | 11/2005 |
| WO | 2008/122480 A1 | 10/2008 |

OTHER PUBLICATIONS

Youtube Video: (Premier Tech Systems and Automation) dated May 21, 2010 https://www.youtube.com/watch?v=HI3V9d51aiM.
Chilean Communication issued in Chilean Patent Application No. 201902076 dated Jun. 8, 2021, with English translation.

* cited by examiner

ROBOTIC PALLETIZING SYSTEM AND METHOD

CROSS-REFERENCE TO RELATED APPLICATIONS

The present application is a U.S. National Stage of International Patent Application No. PCT/CA2018/050088, filed Jan. 25, 2018, which claims priority to U.S. Provisional Patent Application No. 62/450,748, filed on Jan. 26, 2017, the disclosures of which are hereby incorporated by reference in their entirety.

RELATED PATENT APPLICATION

The present application claims priority from U.S. provisional patent application No. 62/450,748, filed Jan. 26, 2017 and entitled "ROBOTIC PALLETIZING SYSTEM AND METHOD", the disclosure of which is hereby incorporated by reference in its entirety.

TECHNICAL FIELD

The present disclosure generally relates to robotic palletizing systems for grouping and securing items together, and more particularly, a robotic palletizing system having a pregrouping station and a principal grouping station. It also relates to a method for grouping and securing items together.

BACKGROUND

Palletizing systems are capable of loading items onto a pallet and securing the items on the pallet so that the large quantity of items can subsequently be transported together as a group of items. Improving the palletizing system can increase the number of items that may be palletized per unit of time, therefore achieving improved efficiency.

SUMMARY

According to one aspect, there is provided a robotic palletizing method that includes selectively operating a palletizing robot between at least a pregrouping state, in which the palletizing robot groups to-be-grouped items at the pregrouping station, and a principal grouping state, in which the palletizing robot groups to-be-grouped items at the principal grouping station and selectively operating a load securing machine between a securing state, in which the load securing machine at least partially secures to-be-grouped items grouped at the principal grouping station, and a non-operational state.

According to another aspect, there is provided a robotic palletizer system having a pregrouping station, a principal grouping station, a palletizing robot and a load securing machine. The palletizing robot is selectively operable in a pregrouping state, in which the palletizing robot groups to-be-grouped items at the pregrouping station, and a principal grouping state, in which the palletizing robot groups to-be-grouped items at the principal grouping station. The load securing machine is selectively operable in a securing state, in which the load securing machine at least partially secures the to-be-grouped items grouped together at the principal grouping station, and a non-operational state.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
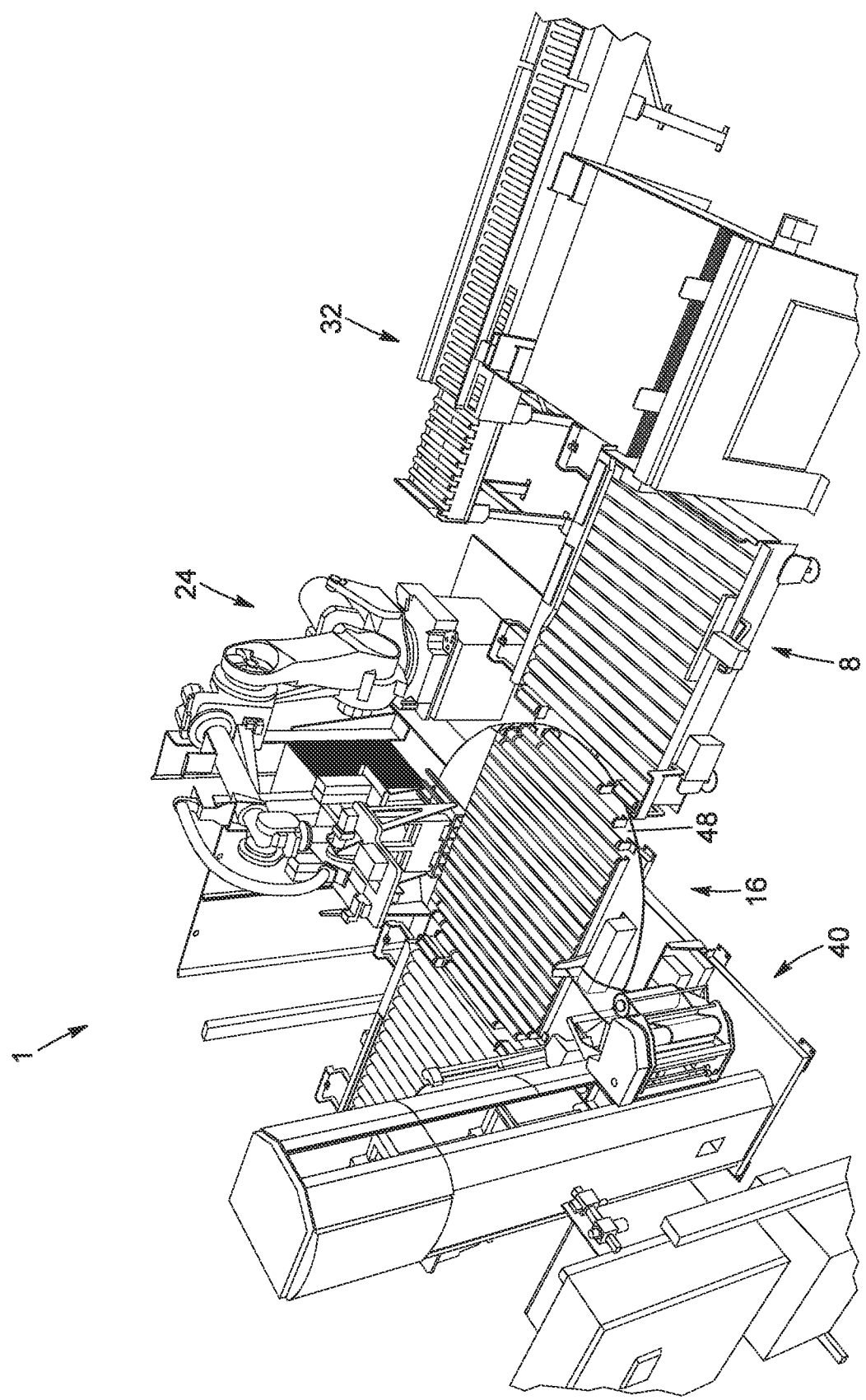
FIG. 1 illustrates a perspective view of a robotic palletizer system according to an example embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

"To-be-grouped items" herein refers to items that need to be grouped, such as loaded onto a pallet, to allow transportation of the items in large quantities. The to-be-grouped items can be items produced from a production line. As used herein, a "to-be-grouped item" includes to an item that has yet to be grouped, such as loaded onto a pallet. A "to-be-grouped item" also includes an item that has been grouped but that the grouped items are not ready for transportation, such as, the grouped items not being properly secured from strapping or wrapping. A "to-be-grouped item" may be in the form of a case, bag, pail, jug, drum, bundle or other type of container.

"Stable to-be-grouped item" herein refers to a to-be-grouped item that has a form (ex: shape and stiffness) that allows a plurality of such stable to-be-grouped items to be grouped together, such as loaded onto a pallet, in a stacked arrangement of multiple layers of items and the grouped items to be transferred while maintaining the stacked arrangement (ex: without items being shifted and falling off the pallet during transferring). For example, stable to-be-grouped items can be grouped in a stacked arrangement of more than two layers while still permitting transferring of the grouped items. For example, stable to-be-grouped items can be loaded to a full capacity of the pallet while still permitting transferring of the pallet.

"Partly stable to-be-grouped item" herein refers to a to-be-grouped item that has a form (ex: shape and stiffness) that allows a plurality such partly stable to-be-grouped items to be grouped, such as loaded onto a pallet, in a stacked arrangement of multiple layers of items but the stacked arrangement becomes unstable if the stacked arrangement is transferred without being properly secured (ex: some items in the stacked arrangement can fall off the pallet if conveyed). For example, partly stable to-be-grouped items can be loaded onto a pallet in a stacked arrangement of more than two layers and maintain the stacked arrangement as long as the pallet is not transferred. For example, partly stable to-be-grouped items can be loaded to a full capacity of the pallet and maintain the stacked arrangement as long as the pallet is not transferred. For example, partly stable to-be-grouped items may include bags filled with granular or pelletized material.

"Unstable to-be-grouped item" herein refers to a to-be-grouped item that has a form (ex: shape and stiffness) that has a limited ability to be grouped, such as loaded onto a pallet, in a stacked arrangement unless the stacked arrangement of items is properly secured. Without providing the securing, the stacked arrangement may become unstable (ex: items shifting or falling off the pallet) if there are too many layers in the stacked arrangement even if the grouped items are immobile. For example, unstable to-be-grouped items cannot be stacked to reach full capacity of a pallet without applying some form of securing. For example, unstable to-be-grouped items can be superposed, such as loaded onto a pallet, in a stacked arrangement of at most two layers without becoming unstable. Furthermore, the stacked arrangement of at most two layers of unstable to-be-grouped items may be transferred while maintaining the stacked arrangement.

"Palletizing", "grouping", "loading" or variants thereof (ex: "to-be-grouped", "palletizes", "load securing") refers to an action or property relating to grouping (ex: stacking) of items to facilitate transportation of the items as a group. Typically, items will be grouped and loaded onto a supporting surface that is the upper surface of pallet, but it should be understood that palletizing or variants thereof also encompass grouping of items to facilitate transportation using a support other than a pallet, such as a skid, cardboard sheet, plastic sheet or metal sheet or combinations thereof. In some examples, an intermediate support member is not provided and the items are directly stacked onto the operating equipment carrying out the palletizing, such as the surface of a conveyor belt or platform of a securing machine. The grouped items are then secured together prior to further transportation. While various examples are described herein with reference to palletizing onto a pallet, such examples are also applicable to palletizing or variants thereof onto other supporting surfaces.

For greater clarity, to-be-grouped items can be received directly onto the operating equipment carrying out the palletizing, such as the surface of a conveyor belt or platform of a securing machine. Examples herein that describe and illustrate methods and systems in which to-be-grouped items are selectively grouped onto a pallet located at the pregrouping station 8 and a pallet located at the principal grouping station 16 are provided for example purposes only. It will be understood that in other example embodiments, to-be-grouped items can be grouped at the pregrouping station 8 and the principal grouping station 16 without use of a pallet.

Referring now to FIG. 1, therein illustrated is a perspective view of a robotic palletizer system 1 according to an example embodiment. The robotic palletizer system 1 includes a pregrouping station 8 and a principal grouping station 16.

According to various example embodiments, a pallet can be received at the pregrouping station 8 at the same time as a pallet is received at the principal grouping station 16. Furthermore, the pallet at the pregrouping station 8 and the pallet at the principal grouping station 16 can simultaneously be in a configuration that is ready for receiving to-be-grouped items. In some situations, both pallets can simultaneously have to-be-grouped items loaded thereon.

The robotic palletizer system 1 further includes a palletizing robot 24 configured for selectively grouping to-be-grouped items at the pregrouping station 8 and at the principal grouping station 16. In the example where a pallet is received at the pregrouping station 8 and another pallet is received at the principal grouping station 16, the robotic palletizer system is configured for selectively loading to-be-grouped items onto the two pallets. Items that are to be palletized may be conveyed, such as from an upstream production line, to a location in the vicinity of the palletizing robot 24. For example, and as illustrated an item conveyor machine 32 is provided to convey to-be-grouped items to the palletizing robot 24. It will be understood that while one item conveyor machine 32 is illustrated, a plurality of conveyor machines 32 may be provided to convey to-be-grouped items to the palletizing robot 24. Furthermore, while the item conveyor machine 32 is illustrated as a set of mechanized conveying rollers 32, it will be understood that any other manner of conveying to-be-grouped items known in the art is contemplated.

The palletizing robot 24 is configured for seizing a to-be-grouped item from the item conveyor machine 32, move the to-be-grouped item to a predetermined position on the pallet at the pregrouping station or the pallet at the principal grouping station (depending on an operating state of the palletizing robot 24) and releasing the to-be-grouped item at the predetermined position on the pallet at the pregrouping station or the pallet at the principal grouping station. The predetermined position where the item is released may be defined by a predetermined sequence of grouping items so that items loaded onto the pregrouping pallet or principal pallet form a desired arrangement. For example, this arrangement may be chosen to improve stability of the loaded items. The palletizing robot 24 may grip and move a plurality of to-be-grouped items at the same time. An end effector of the palletizing robot 24 can be selected to correspond to the time of items that are to be palletized.

According to various example embodiments, a single palletizing robot 24 is provided within the robotic palletizer system 1 to selectively load to-be-grouped items onto both the pallet at the pregrouping station 8 and the pallet at the principal grouping station 16.

The robotic palletizer system 1 further includes a load securing machine 40 configured for at least partially securing the to-be-grouped items that have been loaded onto the pallet at the principal grouping station 16.

The load securing machine 40 is configured to perform the securing of the to-be-grouped items loaded onto the pallet at the principal grouping station 16, or grouped together at the principal grouping station 16. That is, the load securing machine 40 can perform the securing of the to-be-grouped items on the principal grouping station without requiring an intermediate step of transferring the pallet between the grouping of items and the securing of the items.

In one example embodiment, the securing includes applying wrapping material at least partially around the to-be-grouped items so as to secure the items at the principal location. For example, and as illustrated, the load securing machine 40 is a turntable wrapper that includes a turntable 48 and a wrapper applicator 56. The wrapper applicator 56 applies the wrapping material, which may be stretchable, onto the grouped (or loaded) items while the principal pallet is rotated onto the turntable 48. However other load securing machines 40 may be used, such as a rotary arm wrapper, horizontal and vertical ring wrappers or a hooder.

In other example embodiments, the load securing machine 40 can perform the securing of the to-be-grouped items on the principal grouping station 16 in a way other than applying wrapping material, such as by strapping or boxing the to-be-grouped items.

The robotic palletizer system 1 further includes a conveyor subsystem configured for conveying a pallet, or a group of items, located at the principal grouping station 16 that has completed grouping of items and securing of the items from wrapping downstream of the robotic palletizer system 1. The conveyor subsystem is further configured for transferring the pallet or grouped items located at the pregrouping station 8 to the principal grouping station 16. Accordingly, the pallet or grouped items becomes ready to receive to-be-grouped items at the principal grouping station 16.

The palletizing robot 24 is configured to selectively operate between at least a pregrouping state and a principal state. The palletizing robot 24 can also be in a non-operational (ex: idle) state. In its pregrouping state, the palletizing robot 24 carries out seizing of to-be-grouped items, moving the seized to-be-grouped items to the pallet located at the pregrouping station 8 and releasing the to-be-grouped items at the predetermined position on the pallet at the pregrouping station 8.

In its principal grouping state, the palletizing robot 24 carries out seizing of to-be-grouped items, moving the seized to-be-grouped items to the pallet located at the principal grouping station 16 and releasing the to-be-grouped at the predetermined position on the pallet at the principal grouping station 16.

In the non-operational state of the palletizing robot 24, the palletizing robot 24 stops the seizing, moving and releasing of the to-be-grouped items. The palletizing robot 24 can enter either the principal grouping state or the pregrouping state from its non-operational state. To increase or maximize the number of items that may be palletized per unit of time, the non-operational time of the palletizing robot 24 should be reduced or minimized.

Accordingly, the pregrouping station 8 corresponds to a first location at which the palletizing robot 24 is operable to group to-be-grouped items while operating in the pregrouping state. Additionally, the principal grouping station 16 corresponds to a second location at which the palletizing robot 24 is operable to group to-be-grouped items while operating in the principal grouping state. It will be understood that the pregrouping station 8 and the principal grouping station 16 are spaced apart from one another such that operations carried out at the pregrouping station 8 (ex: grouping of items) independently of operations carried out at the principal grouping station 16 (ex: securing of items).

The load securing machine 40 is configured to selectively operate between a securing state and a non-operational state. In its securing state, the load securing machine 40 is operating to at least partially secure the to-be-grouped items that have been received at the principal grouping station 16, such as being loaded onto a pallet located at the principal grouping station 16.

In the non-operational state of the load securing machine 40, the load securing machine 40 stops the securing of the to-be-grouped items that have been received at the principal grouping station 16.

According to one example embodiment, the principal grouping state of the palletizing robot 24 and the securing state of the load securing machine 40 are exclusive of one another. That is, the palletizing robot 24 cannot be operating in its principal grouping state at the same time as the load securing machine 40 is operating in its securing state.

According to one example embodiment, the palletizing robot 24 is configured to operate in its principal grouping state when the load securing machine is operating in its non-operational state. That is, the palletizing robot 24 is configured to operate in its principal grouping state anytime the load securing machine 40 has entered the non-operational state thereof and grouping (or loading) of to-be-grouped items onto the pallet received at the principal grouping station is permitted.

It will be appreciated that the palletizing robot 24 being configured to operate in its principal grouping state whenever the load securing machine 40 is operating in its non-operational state increases the amount of time that the palletizing robot 24 spends grouping (or loading) to-be-grouped items onto the pallet received at the principal grouping station 16.

According to one example embodiment, the palletizing robot 24 is configured to operate in its pregrouping state during at least a portion of a time interval during which the load securing machine 40 is operating in its securing state to secure the to-be-grouped items received at the principal grouping station 16, for instance loaded on the pallet. That is, when the load securing machine 40 is carrying out securing of the to-be-grouped items received at the principal grouping station 16, for instance loaded on the pallet, the palletizing robot 24 operates to group (or load) to-be-grouped items at the pregrouping station 8 instead of grouping (or loading) items at the principal grouping station 16.

It will be appreciated that the palletizing robot 24 cannot be operated in its principal grouping state to group (or load) to-be-grouped items at the principal grouping station 16, for example onto the pallet located at the principal grouping station, when the load securing machine 40 is in its securing state. This would correspond to downtime for loading of items onto the pallet at the principal grouping station 16 and the palletizing robot 24 must wait until the load securing machine 40 exits its securing state before resuming loading of items onto the pallet at the principal grouping station 16. During this time interval, the palletizing robot 24 is operated in its pregrouping state to load to-be-grouped items onto the pallet at the pregrouping station 8, if such grouping (or loading) is permitted. It will be appreciated that the overall idle time of the palletizing robot 24 is decreased due to the palletizing robot 24 operating in its pregrouping state when operating in its principal grouping state is not permitted.

When the pallet at the principal grouping station 16 has completed palletization, in that the pallet has been filled with to-be-grouped items and the items have been appropriately secured, this pallet is transferred by the conveying subsystem to a station downstream of the robotic palletizing system 1. Furthermore, the pallet located at the pregrouping station 8 is transferred by the conveying subsystem to the principal grouping station 16 so that additional to-be-grouped items can be loaded onto the pallet from the palletizing robot 24 operating in the principal grouping state.

The pallet transferred from the pregrouping station 8 to the principal grouping station 16 already has some to-be-grouped items loaded thereon from the palletizing robot 24 previously being operated in the pregrouping state. These already loaded (or grouped) items are herein referred to as the pregrouped set of to-be-grouped items. It will be appreciated that these items were grouped while the load securing machine 40 was in its securing state and the palletizing robot 24 could not enter its principal grouping state.

More to-be-grouped items are further grouped onto the pallet that was transferred from the pregrouping station 8 to the principal grouping station 16 from the palletizing robot 24 being operated in its principal grouping state. These additional items are herein referred to as a principal set of to-be-grouped items.

Furthermore, another pallet is received at the pregrouping station 8 to have loaded (or grouped) thereon to-be-grouped items from the palletizing robot 24 further being operated in its pregrouping state.

According to various example embodiments, the conveying subsystem includes a pregrouped set transfer assembly configured to transfer the pregrouped set of to-be-grouped items from the pregrouping station 8 to the principal grouping station 16. This pregrouped set transfer assembly can include a first conveyor operable for performing the transfer. The conveying subsystem may further include a principal set transfer assembly configured to transfer to-be grouped items grouped and secured at the principal grouping station from the principal grouping station to an area downstream of the principal grouping station. This principal set transfer assembly may include a second conveyor operable for performing the transfer.

When a pallet is received at the principal grouping station 16, the palletizing robot 24 operates in its principal grouping state until an unstable condition or full capacity condition is reached.

An unstable condition is reached upon the to-be-grouped items being loaded in a stacked arrangement onto the pallet at the principal grouping station 16 reaching a number of unsecured stacked layers such that the stacked arrangement becomes unstable and securing by the load securing machine 40 is required before further loading of to-be-grouped items is permitted.

A full capacity condition is reached upon the pallet at the principal grouping station 16 reaching its full capacity from loading or grouping of to-be-grouped items.

When either the unstable condition or the full capacity condition is reached, the palletizing robot 24 exits its principal grouping state and the load securing machine 40 enters its securing state to at least partially secure to-be-grouped items loaded on the pallet at the principal grouping station 16. As described elsewhere herein, the palletizing robot 24 may enter its pregrouping state for at least a portion of a time interval that the load securing machine 40 is operating in its securing state. Upon the load securing machine 40 completing securing of the to-be-grouped items and exiting its securing state, the palletizing robot 24 returns to its principal grouping state to continue loading to-be-grouped items onto the same pallet at the principal grouping station 16 or another pallet that has been transferred from the pregrouping station 8 to the principal grouping station 16.

According to one example embodiment that is suitable for partly unstable to-be-grouped items and/or stable to-be-grouped items, upon receiving a pallet at the principal grouping station 16 (ex: from transferring of the pallet having the pregrouped set already loaded thereon from the pregrouping station 8 to the principal grouping station 16), the palletizing robot 24 is continuously operated in its principal grouping state until completing loading of the principal set of to-be-grouped items onto the pallet at the principal grouping station 16, in which case full capacity of the pallet is reached and the full capacity condition is reached. Upon reaching the full capacity condition, the load securing machine 40 enters its securing state to secure the to-be-grouped items loaded onto the pallet at the principal grouping station 16, during which time the palletizing robot 24 is simultaneously operated in its pregrouping state to group to-be-grouped items onto the pallet received at the pregrouping station 8. Upon completing securing of the to-be-grouped items, the load securing machine 40 enters its non-operational state, the secured pallet at the principal grouping station is transferred downstream of the robotic palletizing system 1 and the pallet at the pregrouping station 8 having a pregrouped set of to-be-grouped items loaded thereon (from previous operation of the palletizing robot 24 in its pregrouping state) is transferred to the principal grouping station 16. Upon receiving this pallet at the principal grouping station 16, the palletizing robot 24 resumes its principal grouping state and continues grouping (or loading) to-be-grouped items onto the pallet at the principal grouping station 16 until the full capacity condition is reached again. The loading of to-be-grouped items onto the pallet currently at the principal grouping station 16, securing of the items, pregrouping of items onto the pallet at the pregrouping station 8 is repeated for a plurality of pallets and to-be-grouped items.

It will be appreciated that this operation of the robotic palletizing system 1 is suitable for partly unstable to-be-grouped items and/or stable to-be-grouped items because layering of the to-be-grouped items within a stacked arrangement is possible without requiring securing of these items until full capacity of the pallet is reached.

Figure 2:
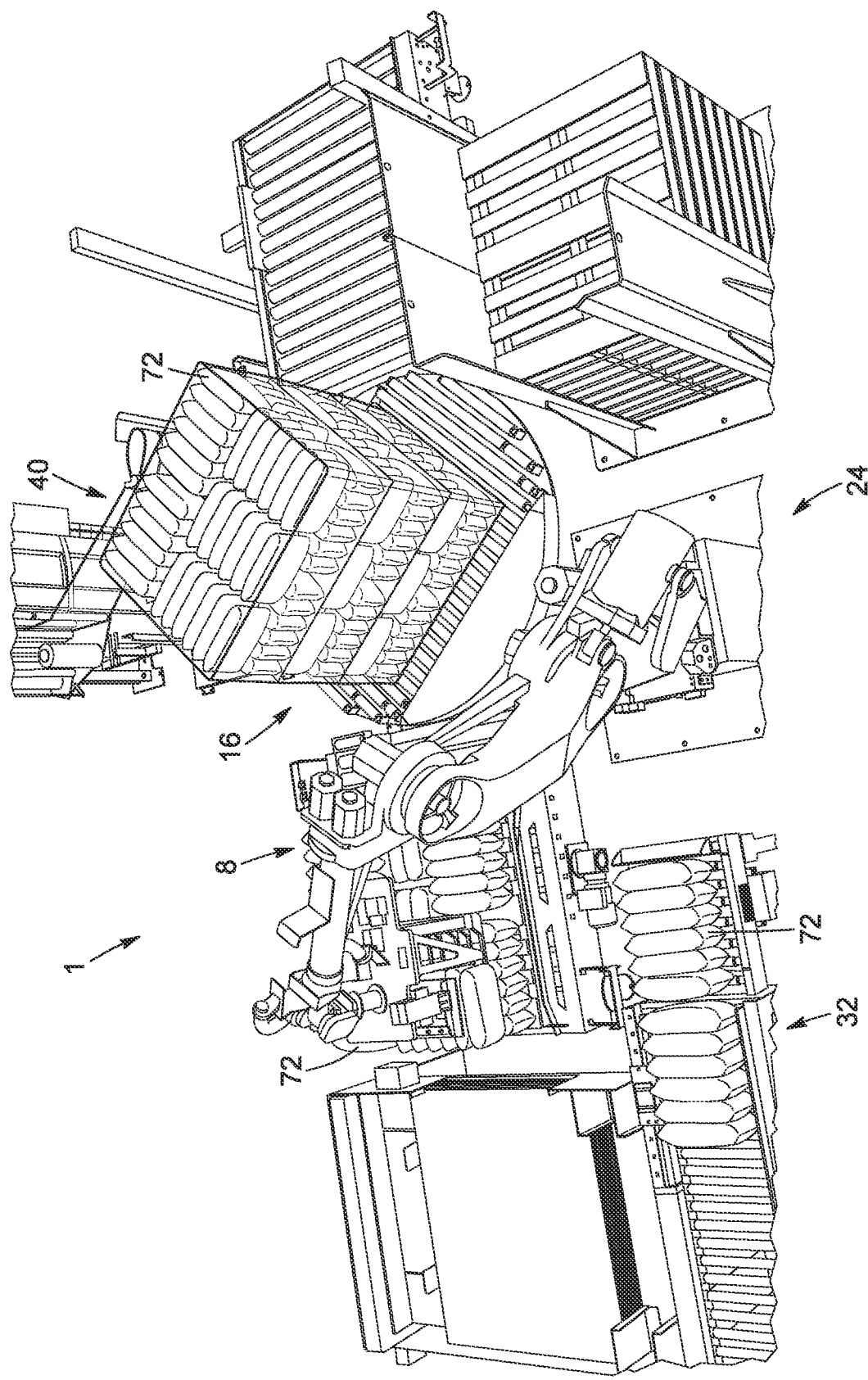
FIG. 2 illustrates a perspective view at a moment of operation of the robotic palletizing system.

Referring now to FIG. 2, therein illustrated is a perspective view at a moment of operation of the robotic palletizing system 1 in which operation of the palletizing robot 24 in its principal grouping state is continued until the pallet at the principal grouping station 16 reaches the full capacity condition. In the snapshot illustrated in FIG. 2, the pallet at the principal grouping station 16 has reached full capacity and the load securing machine 40 is operating in its securing state to secure the to-be-grouped items 72 loaded on the pallet at the principal grouping station 16. At the same time, the palletizing robot 24 is operating in its pregrouping state to group (or load) to-be-grouped items 72 onto the pallet at the pregrouping station 8.

Figure 3A:
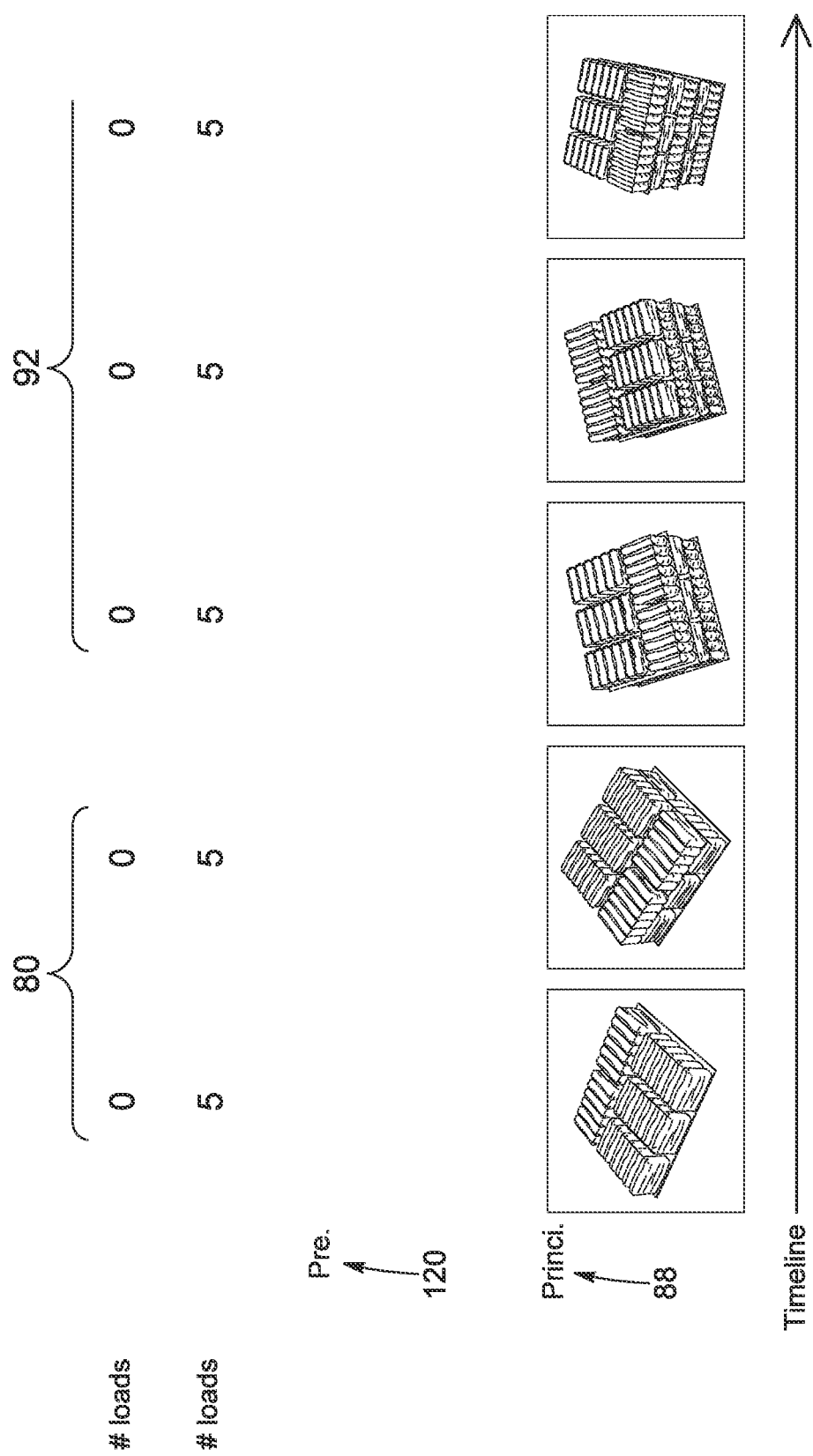
FIGS. 3a to 3c illustrate a sequence in time showing various states of a pallet at a principal grouping station, a pallet at a pregrouping station and operational states of the palletizing robot and a load securing machine according to an example embodiment for grouping partly stable items.
Figure 3B:
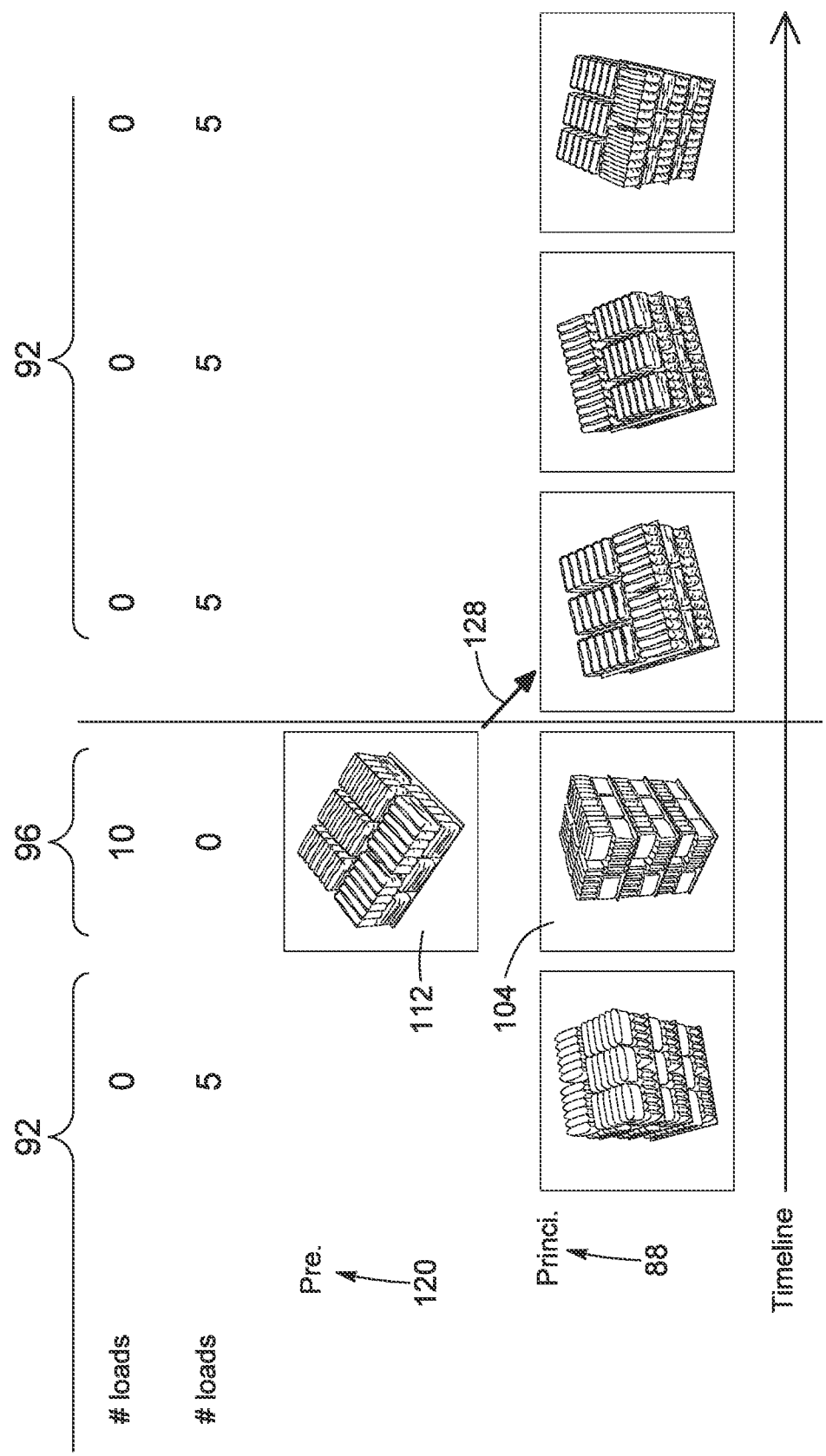
Figure 3C:
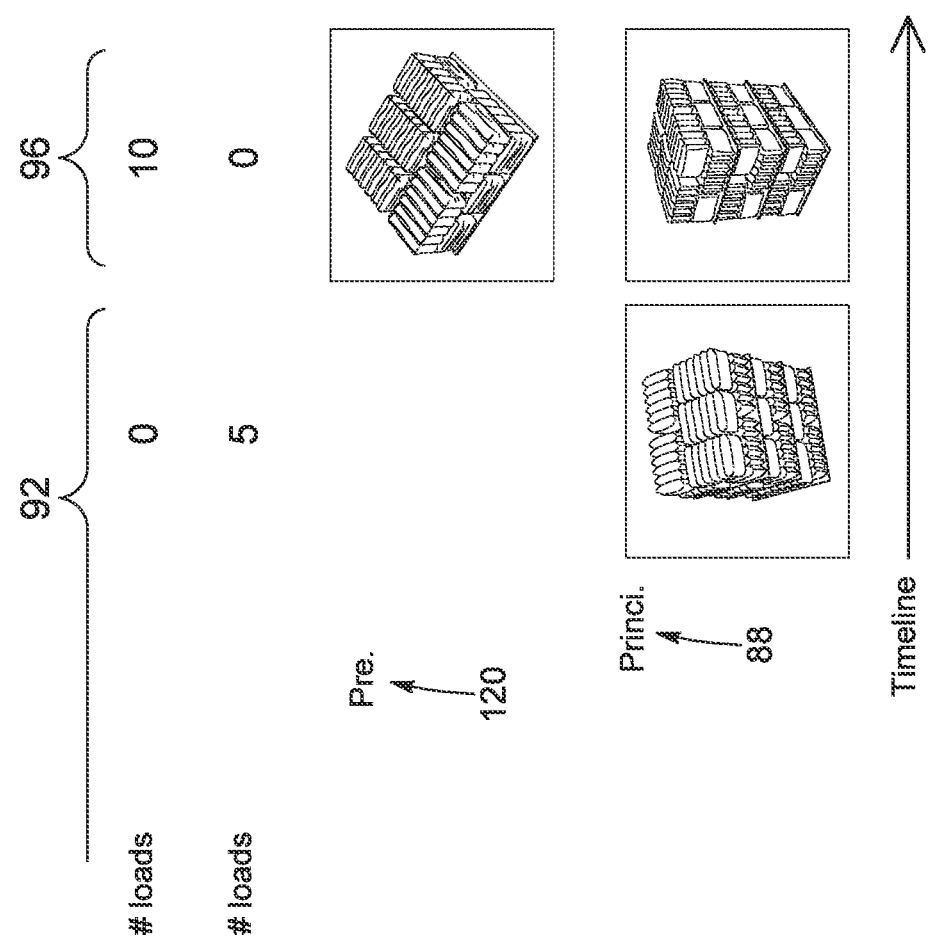

Referring now to FIGS. 3a to 3c, therein illustrated is a sequence in time showing various states of the pallet at the principal grouping station 16, the pallet at the pregrouping station 8 and operational states of the palletizing robot 24 and the load securing machine 40 according to the example embodiment for loading stable and/or partly stable to-be-grouped items. At the beginning of an initialization phase 80, both the pallet at the principal grouping station 16 and the pallet at the pregrouping station 8 are empty. During the initialization phase 80, the palletizing robot 24 is operated in its principal grouping state and the pallet 88 at the principal grouping station 16 is loaded to an amount corresponding to a pregrouped set of to-be-grouped items. In the illustrated example, the palletizing robot 24 undergoes two cycles of seizing items, moving the items and releasing the items. Five loads of items are loaded in each cycle, which corresponds to one layer in the stacked arrangement.

Following the initialization phase 80 and in a principal grouping phase 92, the palletizing robot 24 is continuously operated in its principal grouping state until the pallet 88 at the principal grouping station 16 reaches full capacity and a full capacity condition is reached. In the illustrated example, the palletizing robot 24 undergoes four load cycles to reach the full capacity condition, each load cycle loading five loads of items to form one layer in the stacked arrangement.

Following the principal grouping phase 92 and in a securing phase 96, the load securing machine 40 is operated in its securing mode to secure the principal set of items on the pallet 88 at the principal grouping station 16, which is denoted by the bolded box 104. At the same time, the palletizing robot 24 operates in its pregrouping state, as denoted by box 112, to load items onto pallet 120 at the pregrouping station 8. In the illustrated example, the palletizing robot 24 is capable of loading 10 loads of items onto the pallet 120 at the pregrouping station 8 while the load securing machine 40 is securing the principal set of items. Upon completion of the securing, the pallet 88 is transferred downstream of the robotic palletizing system 1 and the pallet 120 is transferred to the principal grouping station 16, as denoted by arrow 128. Another new pallet (not shown) is transferred to the pregrouping station 8, following transfer of the pallet 120 to the principal grouping station 16.

Another principal grouping phase 92 follows the securing phase 96, in which the load securing machine 40 enters its non-operational state and the palletizing robot 24 resumes operating in its principal grouping state to group (or load) to-be-grouped items onto the pallet that was just received at the principal grouping station 16 after being transferred 128 from the pregrouping station 8. It will be appreciated that this pallet already has a pregrouped set of to-be-grouped items loaded thereon. In the illustrated example, the palletizing robot 24 undergoes four load cycles (or group cycles) to reach the full capacity condition. Upon reaching the full capacity condition, another securing phase 96 is undertaken, in which the items on the pallet at the principal grouping station is secured by the load securing machine 40 operating in the securing state and the palletizing robot 24 simultaneously operates in the pregrouping state to load items onto another pallet received at the pregrouping station 8. The principal grouping phase 92, the securing phase 96 and the transferring of pallets are repeated for a plurality of pallets and to-be-grouped items.

According to one example embodiment that is suitable for unstable to-be-grouped items, upon receiving a pallet at the principal grouping station 16 from transferring of the pallet having the pregrouped set already loaded thereon from the pregrouping station 8 to the principal grouping station 16, the load securing machine 40 is operated in its securing state to secure the pregrouped set prior to further operating the palletizing robot 24 in the principal grouping state. During the load securing machine 40 operating in its securing state to secure the pregrouped set, the palletizing robot 24 is simultaneously operated in its pregrouping state to load to-be-grouped items onto another pallet received at the pregrouping station 8. Upon completing securing of the pregrouped set of to-be-grouped items, the load securing machine 40 enters its non-operational state, and the palletizing robot 24 enters its principal grouping state to load additional to-be-grouped items onto the pallet at the principal grouping station 16. The palletizing robot 24 continues in its principal grouping state until an unstable condition is reached on the pallet at the principal grouping station 16, in which further loading of to-be-grouped items onto the pallet at the principal grouping station 16 is not permitted unless securing is applied. It will be appreciated that due to the unstable form of unstable to-be-grouped items, securing of the items is necessary anytime the number of unsecured layers within the stacked arrangement reaches a threshold wherein further loading may cause the stacked arrangement to become unstable.

Upon reaching the unstable condition on the pallet at the principal grouping station 16, the load securing machine 40 is operated in its securing state to secure any unsecured layers of the items on the pallet at the principal grouping station 16. During securing of the unsecured layers of items, the palletizing robot 24 may enter its pregrouping state to load to-be-grouped items onto the pallet at the pregrouping station 8. Alternatively, the palletizing robot 24 may enter its non-operational state if further loading of items onto the pallet at the pregrouped station is not permitted, such as due to the pregrouped set reaching an unstable condition on the pallet at the pregrouping station 8. Upon completion of the securing of the unsecured layers of the items on the pallet at the principal grouping station 16, the palletizing robot 24 returns to its principal grouping state to load further to-be-grouped items onto the pallet at the principal grouping station 16. The grouping (or loading) of items onto the principal grouping station 16 and the securing of unsecured layers of the principal set of items is repeated until the full capacity condition is reached.

Upon reaching the full capacity condition, the load securing machine 40 is further operated in its securing state to secure the items loaded onto the pallet at the principal grouping station 16. The palletizing robot 24 may be further simultaneously operated in its pregrouping state to load to-be-grouped items onto the pallet received at the pregrouping station 8. Upon completing securing of the to-be-grouped items, the load securing machine 40 enters its non-operational state, the secured pallet at the principal grouping station is transferred downstream of the robotic palletizing system 1 and the pallet at the pregrouping station 8 having a pregrouped set of to-be-grouped items loaded thereon (from previous operation of the palletizing robot 24 in its pregrouping state) is transferred to the principal grouping station 16. The loading of to-be-grouped items onto the pallet currently at the principal grouping station 16, securing of the items, pregrouping of items onto the pallet at the pregrouping station 8 is repeated for a plurality of pallets and to-be-grouped items.

Figure 4:
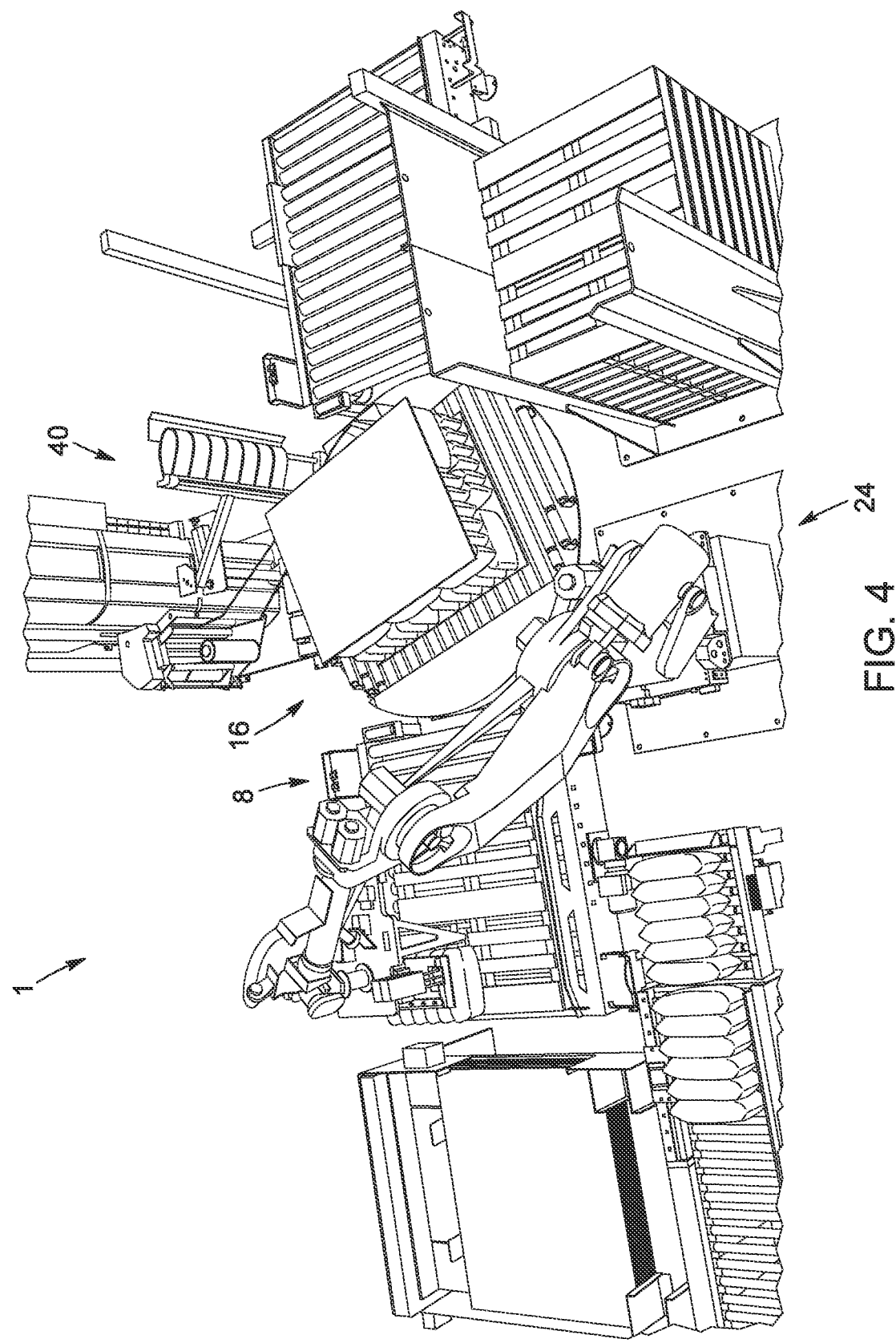
FIG. 4 is a perspective view at a first moment of operation of the robotic palletizing system according to an example embodiment for grouping unstable items.

Referring now to FIG. 4, therein illustrated is a perspective view at a first moment of operation of the robotic palletizing system 1 in which securing is applied when unstable conditions are reached. In the snapshot illustrated in FIG. 4, the pallet at the principal grouping station 16 has been received at the principal grouping station 16 after having undergone pregrouping at the pregrouping station 8. The load securing machine 40 is operating in its securing state to secure the pregrouped set on the pallet at the principal grouping station 16. At the same time, the palletizing robot 24 is operating in its pregrouping state to load to-be-grouped items onto the pallet 88 received at the pregrouping station 8.

Figure 5:
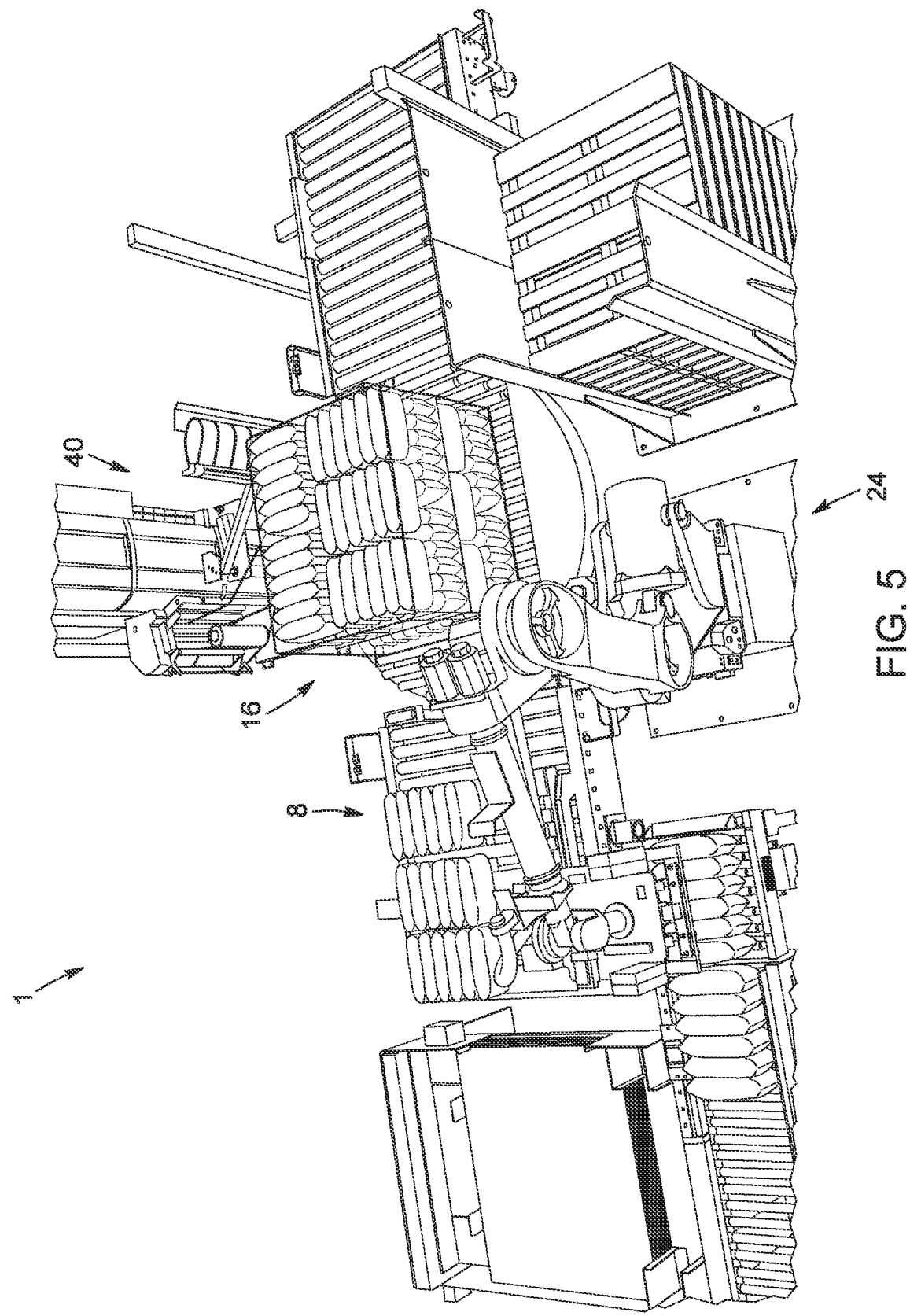
FIG. 5 illustrates a perspective view at a second moment of operation of the robotic palletizing system according to an example embodiment for grouping unstable items.

Referring now to FIG. 5, therein illustrated is a perspective view at a second moment of operation of the robotic palletizing system 1, in which the palletizing robot 24 has continued operating in its principal grouping state to load additional to-be-grouped items onto the pallet at the principal grouping station 16 after completing securing of the pregrouped set. It will be appreciated that in the illustrated example, an unstable condition is reached when two additional layers of to-be-grouped items have been loaded onto the pallet at the principal grouping station 16.

Figure 6:
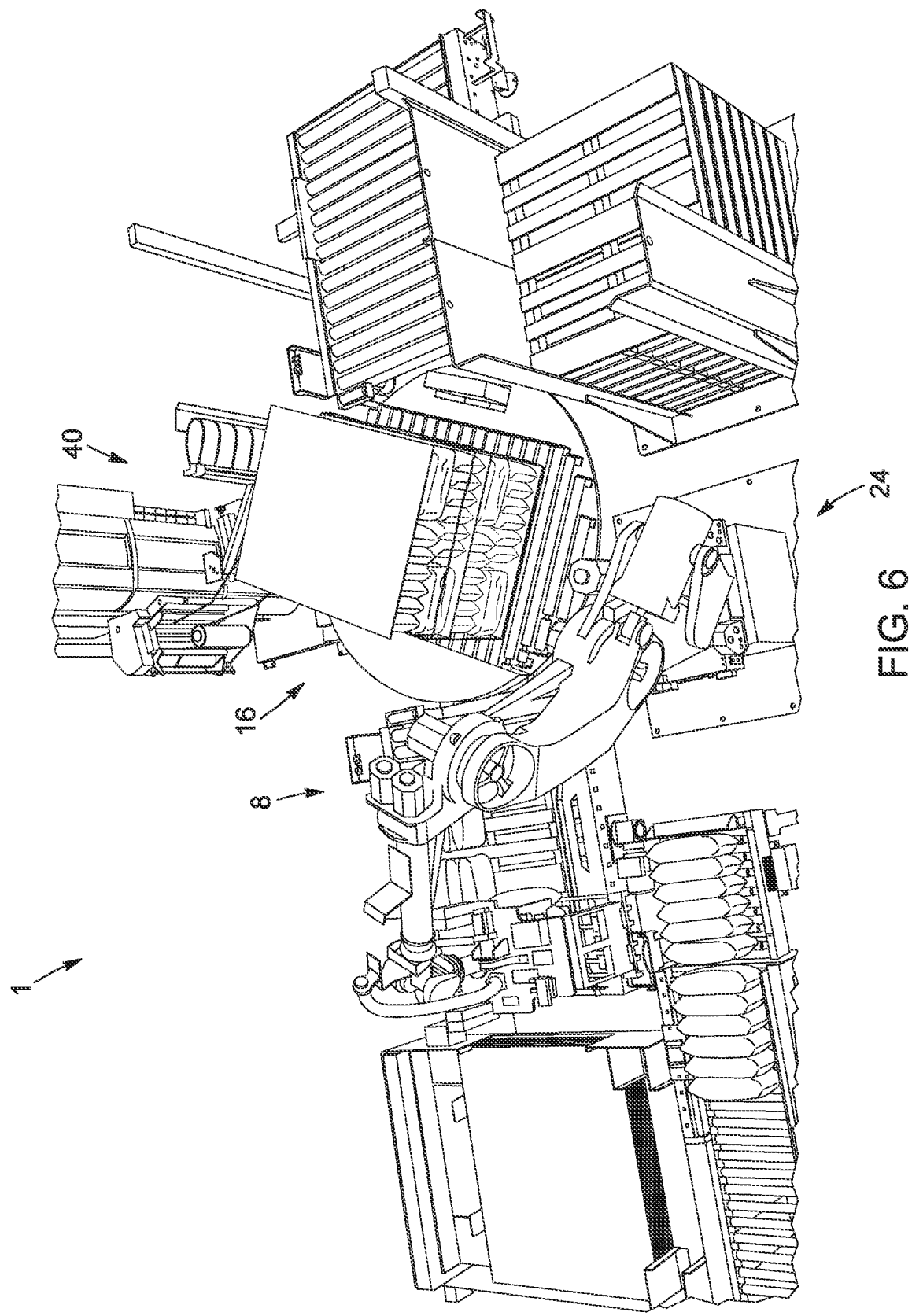
FIG. 6 illustrates a perspective view at a third moment of operation of the robotic palletizing system according to an example embodiment for grouping unstable items.

Referring now to FIG. 6, therein illustrated is a perspective view at a third moment of operation of the robotic palletizing system 1, in which the load securing machine 40 is being operated in its securing state to secure the additional layers of to-be-grouped items loaded onto the pallet at the principal grouping station 16, after the unstable condition having been reached. At the same time, the palletizing robot 24 is operating its pregrouping state to load to-be-grouped items onto the pallet received at the pregrouping station 8.

Figure 7:
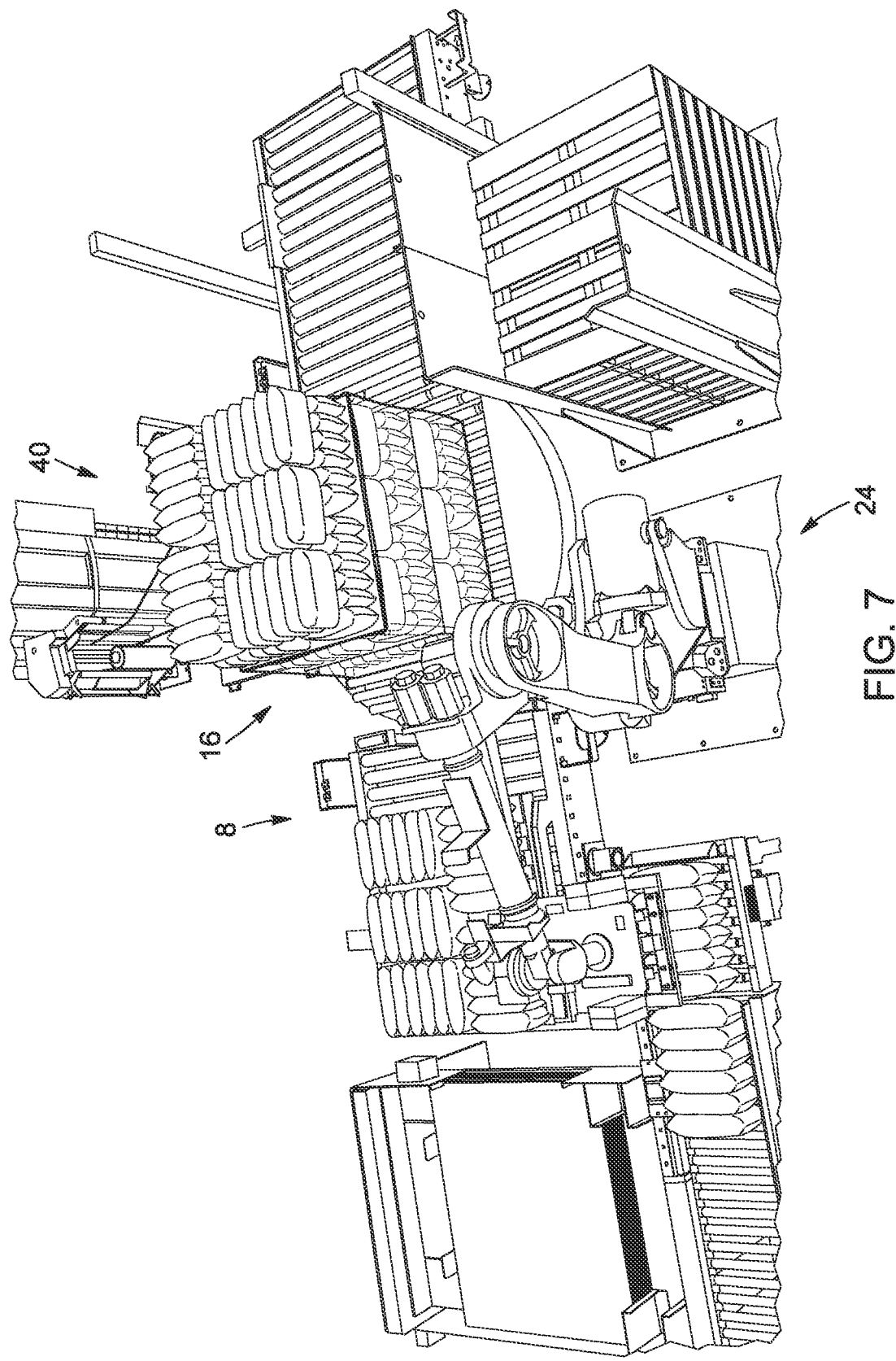
FIG. 7 illustrates a perspective view at a fourth moment of operation of the robotic palletizing system according to an example embodiment for grouping unstable items.

Referring now to FIG. 7, therein illustrated is a perspective view at a fourth moment of operation of the robotic palletizing system, in which the palletizing robot 24 has continued operating in its principal grouping state to load yet other to-be-grouped items onto the pallet at the principal grouping station 16. It will be appreciated that in the illustrated example, a fifth layer and a sixth layer of to-be-grouped items have been loaded onto the pallet at the principal grouping station 16 and the full capacity condition is reached.

Figure 8:
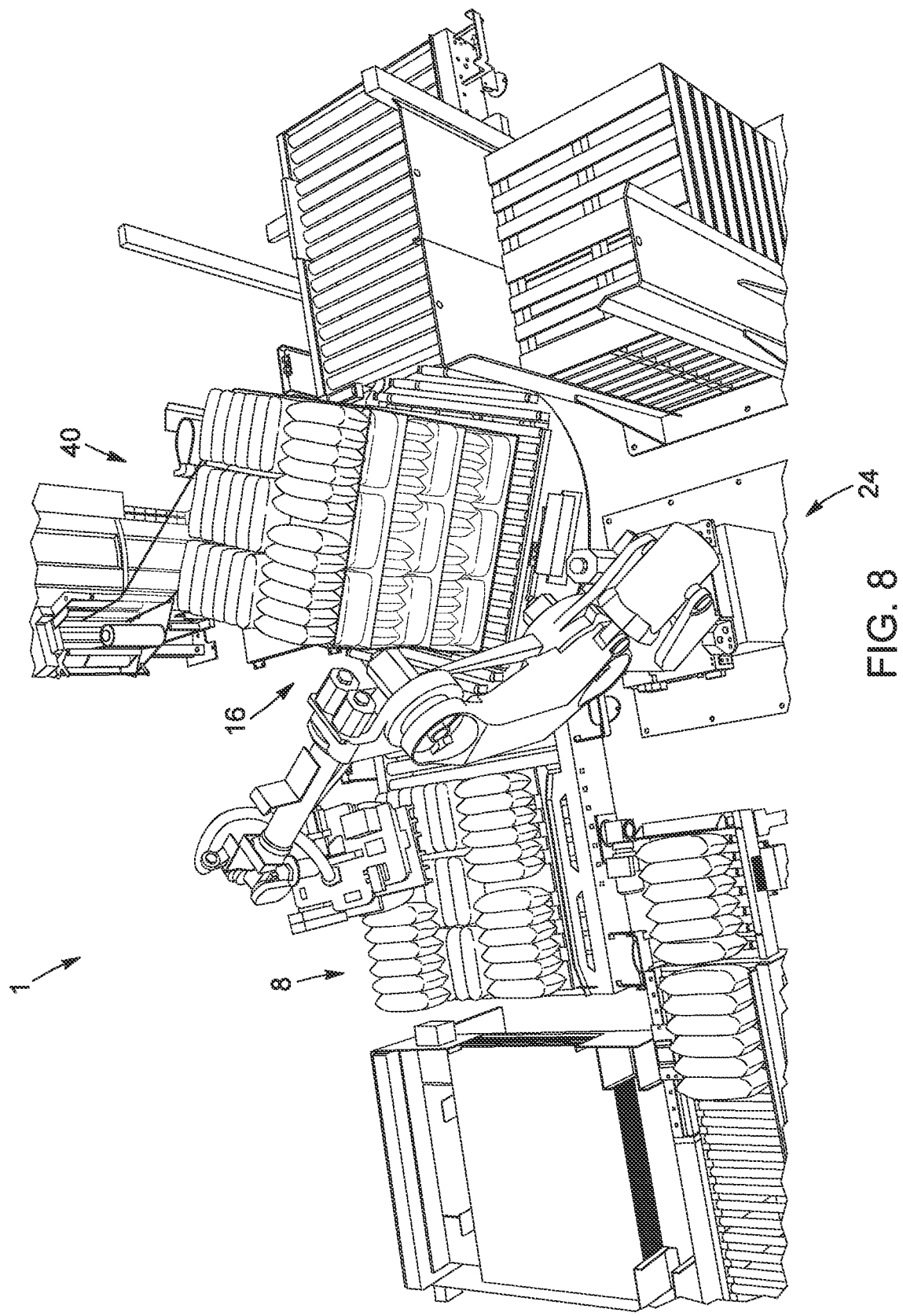
FIG. 8 illustrates a perspective view at a fifth moment of operation of the robotic palletizing system according to an example embodiment for grouping unstable items.
Figure 9A:
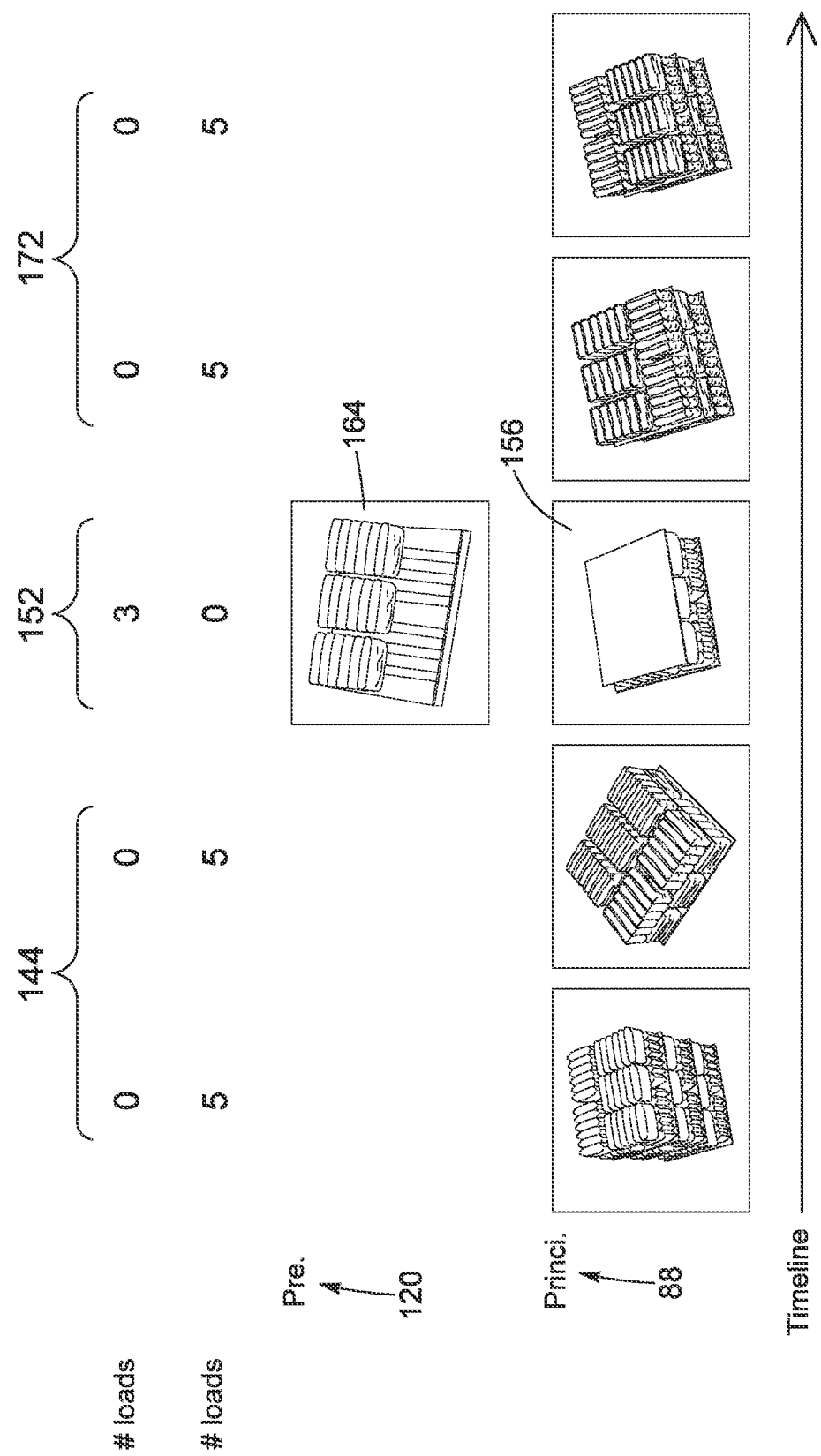
FIGS. 9a to 9d illustrate a sequence in time showing various states of the pallet at the principal grouping station, the pallet at the pregrouping station and operational states of the palletizing robot and the load securing machine according to an example embodiment for grouping unstable items.
Figure 9B:
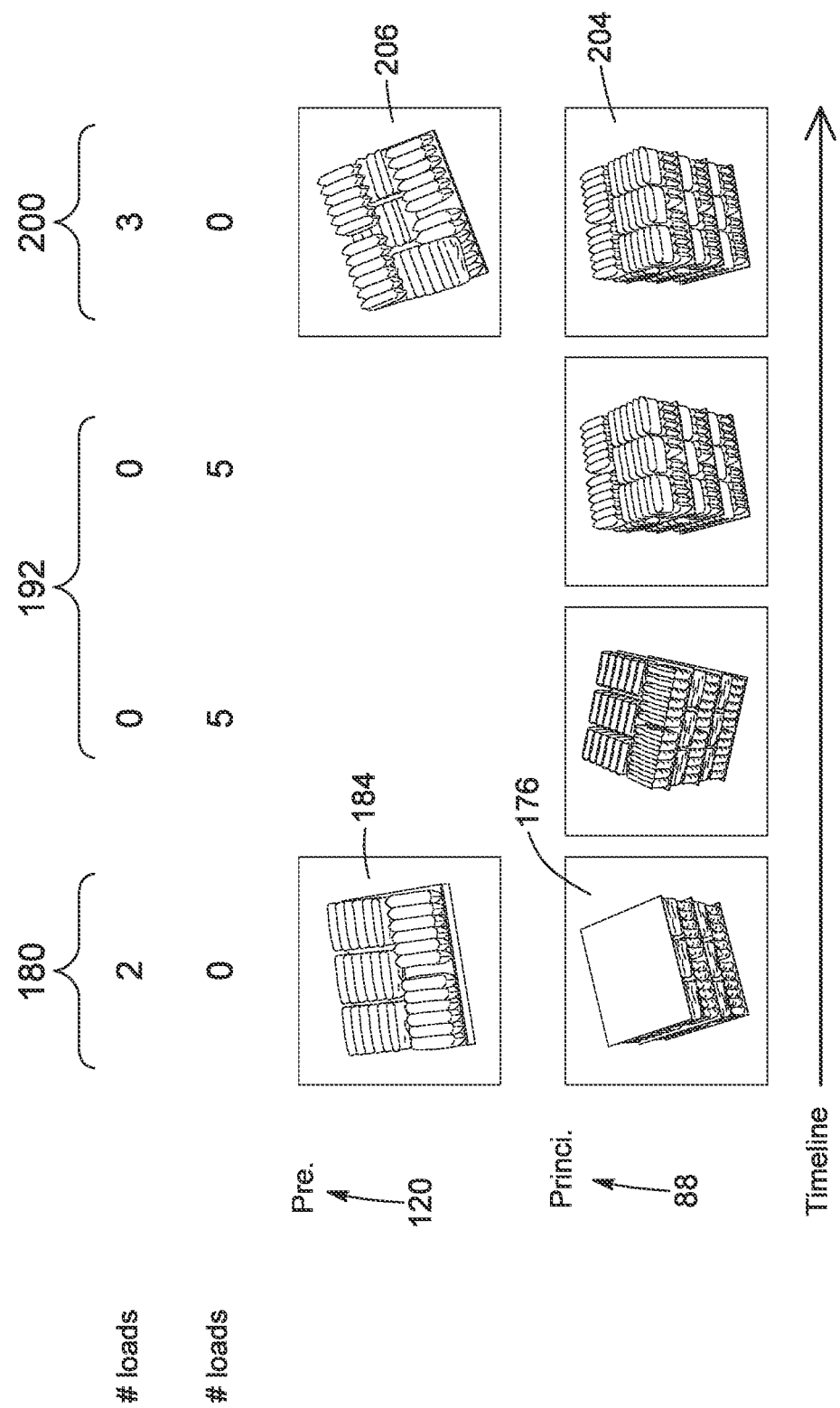
Figure 9C:
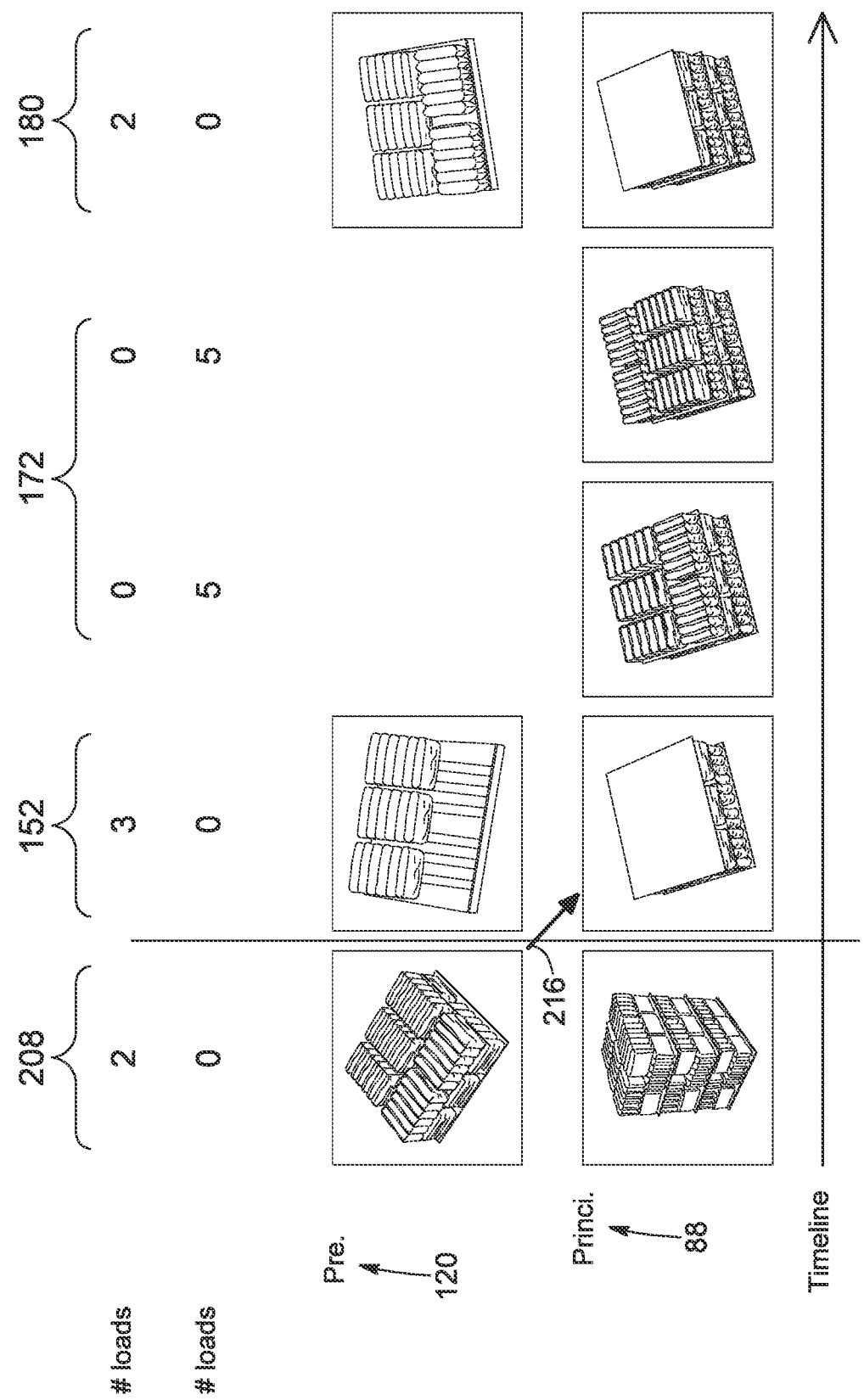
Figure 9D:
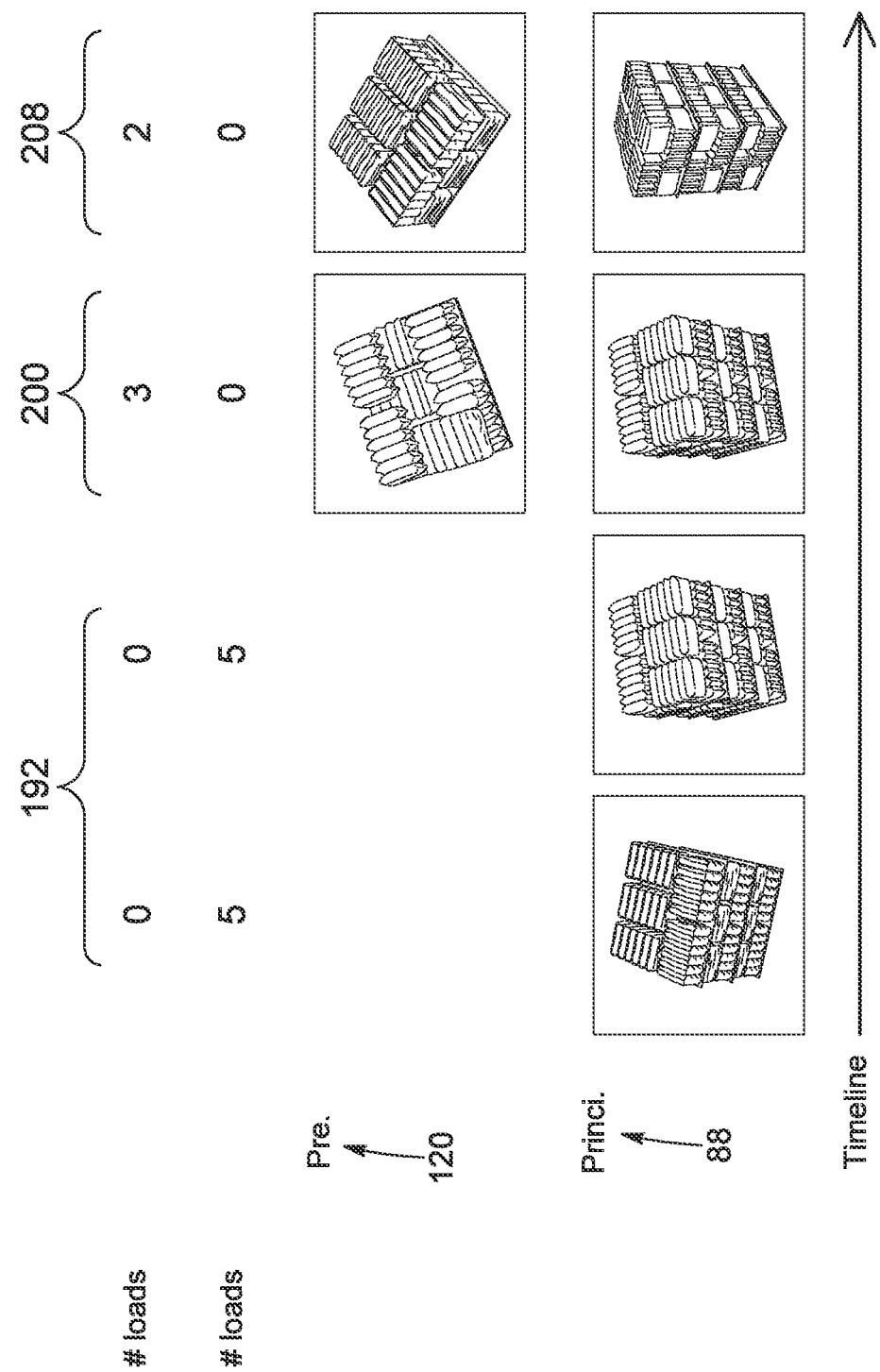

Referring now to FIG. 8, therein illustrated is a perspective view at a fifth moment of operation of the robotic palletizing system 1, in which the load securing machine 40 is operating in its securing state to secure the principal set of to-be-grouped items 72. At the same time, the palletizing robot 24 is operating in its pregrouping state to load to-be-grouped items 72 onto the pallet at the pregrouping station 8.

Referring now to FIGS. 9a to 9d, therein illustrated is a sequence in time showing various states of the pallet at the principal grouping station 16, the pallet at the pregrouping station 8 and operational states of the palletizing robot 24 and the load securing machine 40 for loading of unstable to-be-grouped items. At the beginning of an initialization phase 144, both the pallet at the principal grouping station 16 and the pallet at the pregrouping station 8 are empty. During the initialization phase 144, the palletizing robot 24 is continuously operated in its principal grouping state and the pallet 88 at the principal grouping station 16 is loaded until it reaches a level corresponding to what would be filled as a pregrouped set. In the illustrated example, two layers of unstable items are loaded. This also corresponds to an unstable condition.

Following the initialization phase 144 and in a first partial securing phase 152, the load securing machine 40 is operating in its securing state to secure the pregrouped set on the pallet at the principal grouping station 16, which is denoted by the snapshot 156. At the same time, the palletizing robot 24 is operating in its pregrouping state, as denoted by snapshot 164, to load items onto the pallet 120 at the pregrouping station 8. In the illustrated example, the palletizing robot 24 is capable of loading 3 loads of items (ex: 5 to-be-grouped items per load) onto the pallet 120 at the pregrouping station 8 while the load securing machine 40 is securing the pregrouped set of items. Typically less time is required to secure the two layers of items on the pallet 88 at the principal grouping station 16 than the time required to secure a pallet 88 that has been loaded to full capacity and less loads of item may be loaded onto the pregrouping station 8 during that time.

Following the first partial securing phase 152 and in a first principal grouping phase 172, the load securing machine 40 enters its non-operational state and the palletizing robot 24 is operating in its principal grouping state to load items onto the pallet at the principal grouping station 16 until a next unstable condition is reached. In the illustrated example, the palletizing robot 24 is capable of carrying out two cycles of five loads each, which corresponds to the loading two layers of items within the stacked arrangement, before the unstable condition is reached.

Following the first principal grouping phase 172 and in a second partial securing phase 180, the load securing machine 40 is operating in its securing state to secure the unstable items loaded during the first principal grouping phase 172, this securing being denoted by snapshot 176. At the same time, the palletizing robot 24 is operating in its pregrouping state, as denoted by snapshot 184, to load items onto the pallet 120 at the pregrouping station. In the illustrated example, the palletizing robot 24 is capable of loading 2 loads of items onto the pallet 120 at the pregrouping station 8 while the load securing machine 40 is securing the unstable items that were loaded during the first principal grouping phase 172.

Following the second partial securing phase 180 and in a second principal grouping phase 192, the load securing machine 40 enters its non-operational state and the palletizing robot 24 is operating in its principal grouping state to load items onto the pallet at the principal grouping station 16 until the full capacity condition is reached. In the illustrated example, the palletizing robot 24 is capable of carrying out two cycles of five loads each before the full capacity condition is reached.

Following the second principal grouping phase 192, the load securing machine 40 is operating in its securing state to secure the principal set of items loaded onto the pallet 88 at the principal grouping station 16. The securing may occur in two sub-phases, in which in a first sub-phase 200, securing is applied to only the unstable items loaded during the second principal grouping phase 192, as denoted by dotted bolded snapshot 204. At the same time, during this first sub-phase 200, the palletizing robot 24 is operating in its pregrouping state, as denoted by snapshot 206. In the illustrated example, the palletizing robot 24 is capable of loading 3 loads of items onto the pallet 120 at the pregrouping station 8 while the load securing machine 40 is securing the unstable items that were loaded during the second principal grouping phase 192.

In a second sub-phase 208, additional securing is applied to the whole of the to-be-grouped items loaded onto the pallet 88 at the principal grouping station 16, as denoted by snapshot 210. At the same time, during this second sub-phase 208, the palletizing robot 24 continues to operate in its pregrouping state, as denoted by snapshot 212. In the illustrated example, the palletizing robot 24 is capable of loading 2 more loads of items onto the pallet 120 at the pregrouping station 8 while the load securing machine 40 is securing the whole of the to-be-grouped items loaded onto the pallet 88 at the principal grouping station 16.

While the example of FIG. 9 shows a single principal grouping phase 172 which reaching an unstable condition, it will be understood that in other examples, multiple unstable conditions may be reached from principal grouping phases 172. For example, a first principal grouping phase 172 reaches a first unstable condition that requires securing the set of items grouped (or loaded) from this principal grouping phase 172. One or more principal grouping phases may be carried out that each reaches the unstable condition before finally reaching the full capacity condition. That is, for each pallet received at the principal grouping station, multiple principal grouping phases 172 that reach an unstable condition may take place before a full condition is reached.

While the example of FIG. 9 is applicable to unstable to-be-grouped items in which securing of already grouped (or loaded) to-be-grouped items is applied before reaching the fully capacity condition, such intermediate securing may also be applied when grouping (or loading) stable to-be-grouped items or partly stable to-be-grouped items. For example, this may be useful where further stability is required during transportation.

Upon completion of the securing, the pallet 88 is transferred downstream of the robotic palletizing system 1 and the pallet 120 is transferred to the principal grouping station 16, as denoted by arrow 216. The pallet is received at the principal grouping station 16 having already a set of pregrouped items loaded thereon. Phases 152, 172, 180, 192, 200 and 208 as described herein can be repeated for additional pallets and additional to-be-grouped items.

Figure 10:
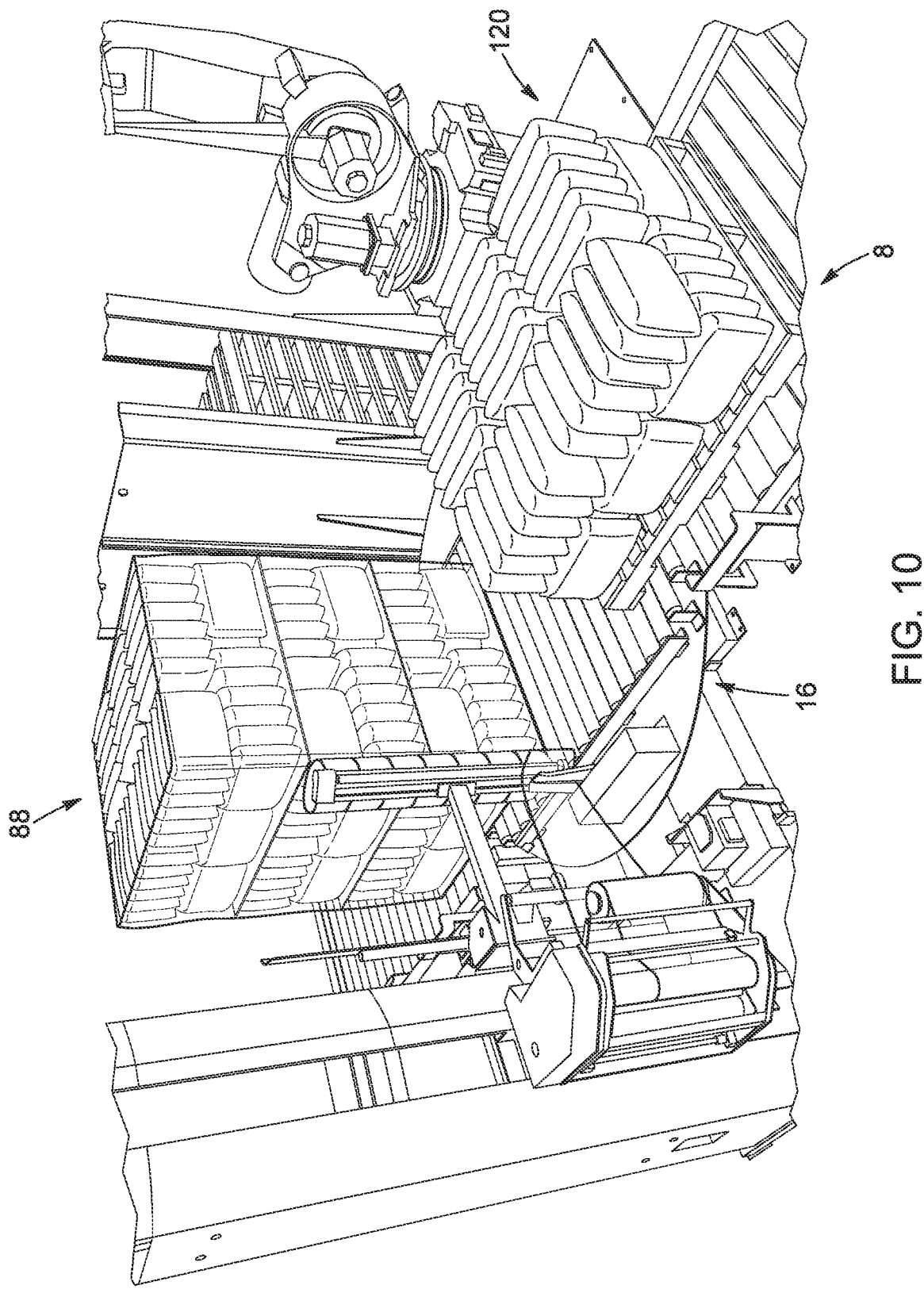
FIG. 10 illustrates a perspective view in which the pallet having been completely palletized (grouped and fully secured) is being transferred from the principal grouping station downstream of the robotic palletizing system.

FIG. 10 illustrates a perspective view in which the pallet 88 having been completely palletized (loaded and fully secured) is being transferred from the principal grouping station 16 downstream of the robotic palletizing system 1. At the same time, the pallet 120 having a pregrouped set of to-be-grouped items already loaded thereon is transferred from the pregrouping station 8 to the principal grouping station 16.

Figure 11:
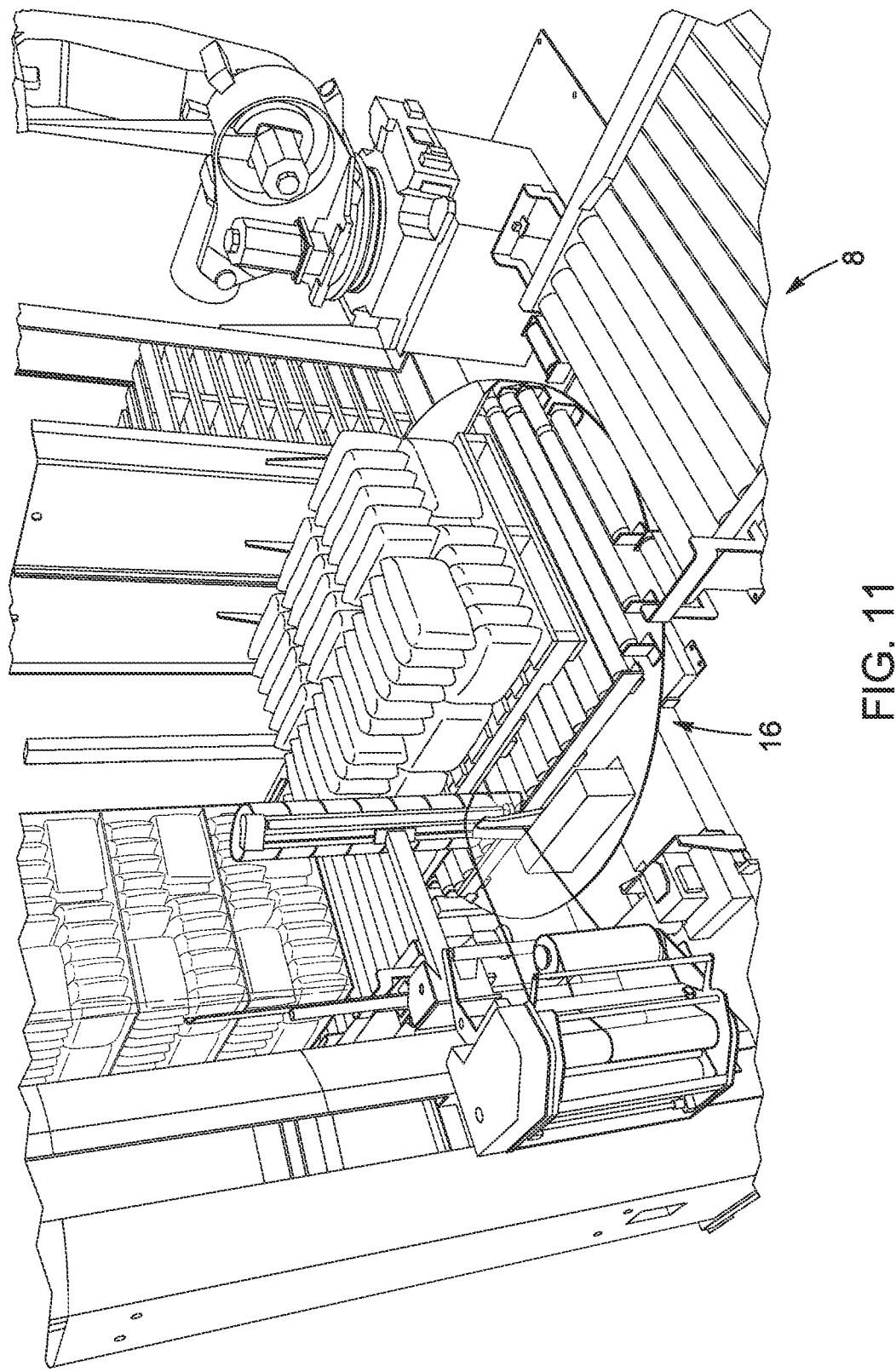
FIG. 11 shows the pallet having the pregrouped set being received at the principal grouping station and being ready for receiving additional to-be-grouped items.

FIG. 11 shows the pallet 120 having the pregrouped set being received at the principal grouping station 16 and being ready for receiving additional to-be-grouped items. Another pallet (not shown) is to be placed at the pregrouping station 8 for receiving of to-be-grouped items from operation of the palletizing robot 24 in its pregrouping state.

It will be appreciated that for a given pallet, if the palletizing robot 24 completes loading of the pregrouped set such that an unstable condition is reached at the pallet at the pregrouping station 8 in less time than the amount of time required to complete securing of items at the principal grouping station 16, the palletizing robot 24 will have to enter its non-operational state because it has to wait for the load securing machine 40 to complete securing of unstable layers while the palletizing robot 24 is unable to load additional items onto the pallet at the pregrouping station 8.

It will be further appreciated that for a given pallet, if the palletizing robot 24 takes more time to complete loading of the pregrouped set before reaching the unstable condition at the pallet at the pregrouping station 8 than the amount of time required to complete securing of items at the principal grouping station 16, the palletizing robot 24 will not have loaded as many items onto the pallet at the pregrouping station 8 as it otherwise could have before the pallet is transferred to the principal grouping station 16.

According to various example embodiment for loading unstable to-be-grouped items, for a given pallet, the palletizing robot 24 and the load securing machine 40 is configured so that the amount of time that the load securing machine 40 is operating in its securing state to apply securing when an unstable condition is reached (including securing of the pregrouped set of items when the pallet is received at the principal grouping station 16 from the pregrouping station 8) closely matches the amount of time required by the palletizing robot 24 to operate in its pregrouping state to complete loading of the pregrouping set. Accordingly, the amount of time that the palletizing robot 24 spends in its non-operational state is minimized and more items are grouped (or loaded) at the pregrouping station 8 prior to being transferred to the principal grouping station 16.

Figure 12:
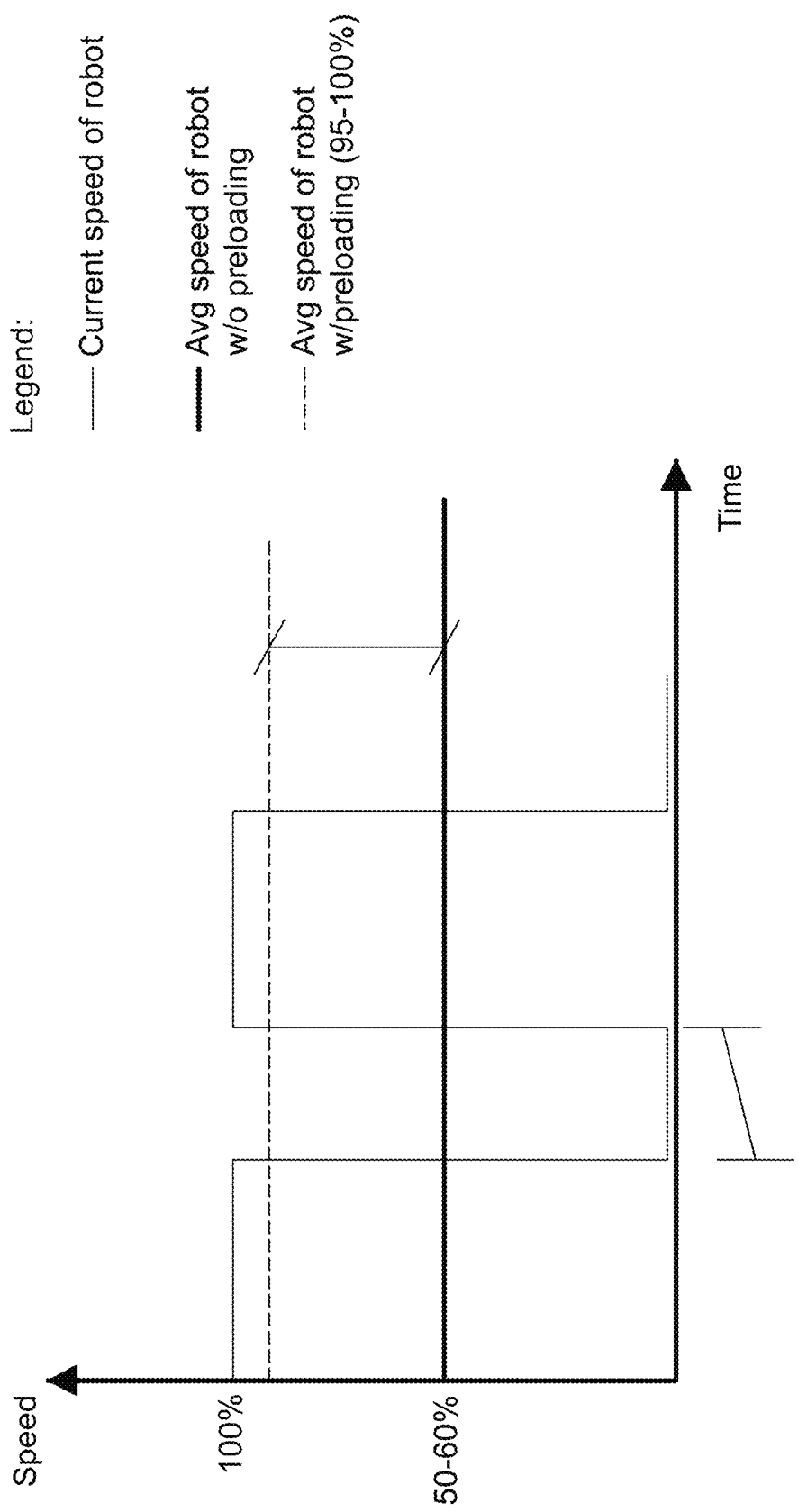
FIG. 12 a graph showing performance of the palletizing robot with and without pregrouping for partly stable to-be-grouped items.

Referring now to FIG. 12, therein illustrated is a graph showing an example of performance of the palletizing robot 24 with and without pregrouping for partly stable to-be-grouped items. It will be appreciated that without the pregrouping state, the palletizing robot 24 has an average speed of 50 to 60% of its maximum speed due to idle times as it waits for partly unstable to-be-grouped items to be secured by load securing machine 40. When the pregrouping state is available, the average speed of the palletizing robot 24 increases to about 95% due to the palletizing robot 24 being able to operate in its pregrouping state when the load securing machine 40 is in its securing state.

Figure 13:
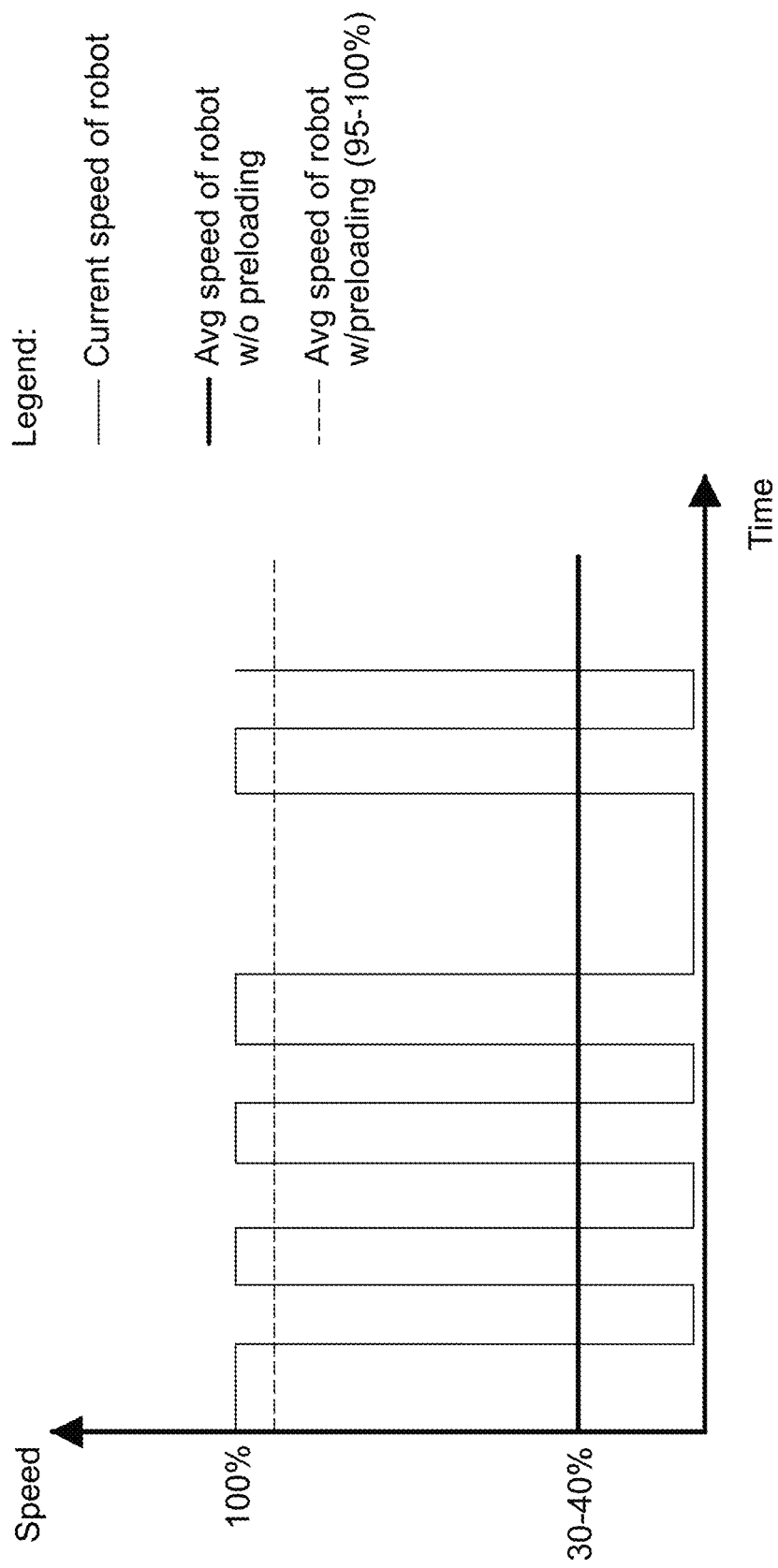
FIG. 13 illustrates graph showing performance of the palletizing robot with and without pregrouping for unstable to-be-grouped items.

Referring now to FIG. 13, therein illustrated is a graph showing an example of performance of the palletizing robot 24 with and without pregrouping for unstable to-be-grouped items. It will be appreciated that without the pregrouping state, the palletizing robot 24 has an average speed of 30 to 40% of its maximum speed due to idle times as it waits for unstable to-be-grouped items to be secured by load securing machine 40 any time an unstable condition is reached. When the pregrouping state is available, the average speed of the palletizing robot 24 increases to about 95% due to the palletizing robot 24 being able to operate in its pregrouping state when the load securing machine 40 is in its securing state.

Figure 14:
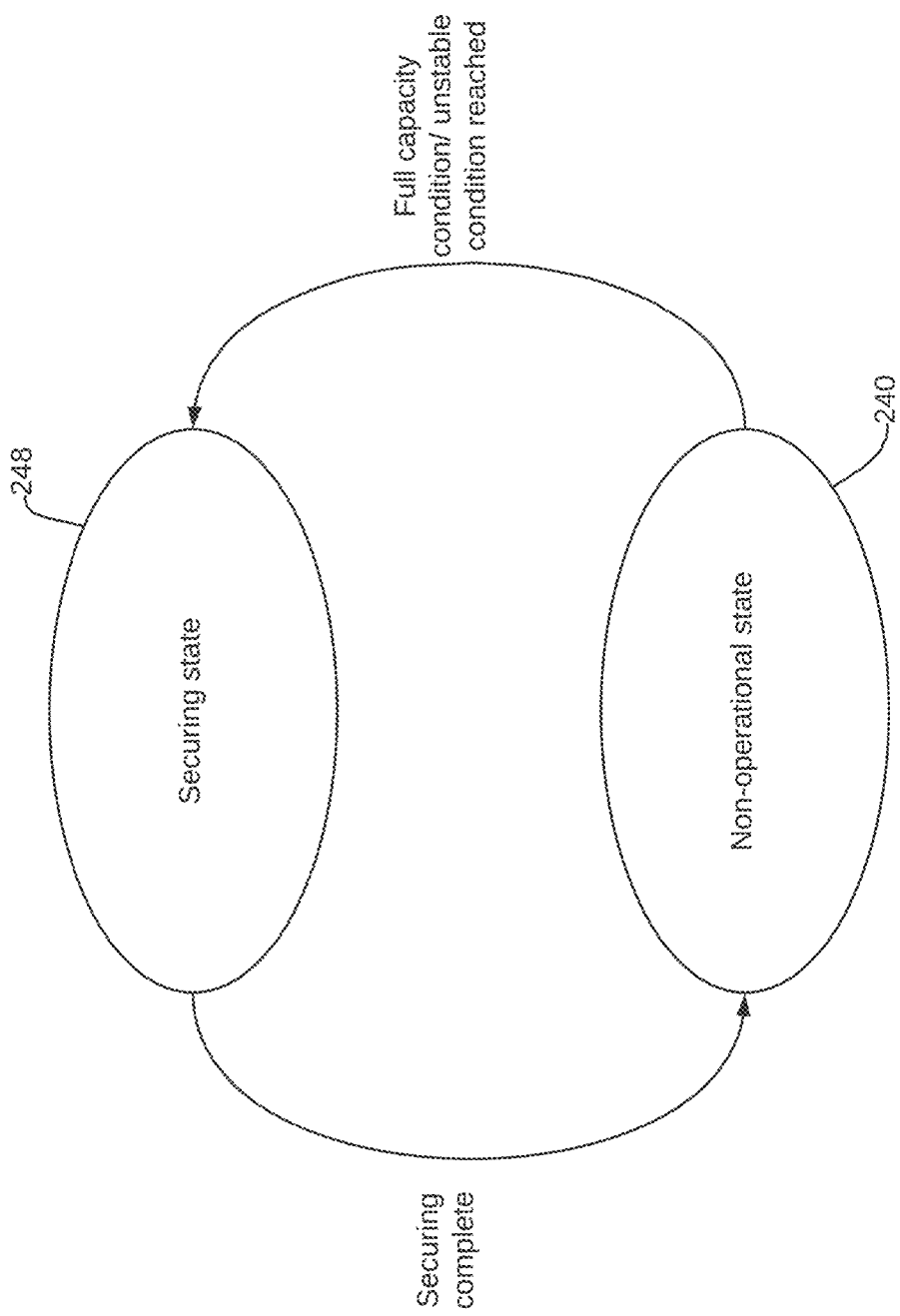
FIG. 14 illustrates a state diagram showing the states of the load securing machine according to an example embodiment.

Referring now to FIG. 14, therein illustrated is a state diagram showing the states of the load securing machine 40 according to an example embodiment. The load securing machine 40 is generally in a non-operational state 240. Upon the pallet at the principal grouping station 16 reaching a full capacity condition or an unstable condition, the load securing machine 40 enters its securing state 248 and operates to secure items loaded onto the pallet. Upon completing the securing, either of the unstable layers when there is an unstable condition or of all of the items when full capacity is reached, the load securing machine 40 returns to its non-operational state 240.

Figure 15:
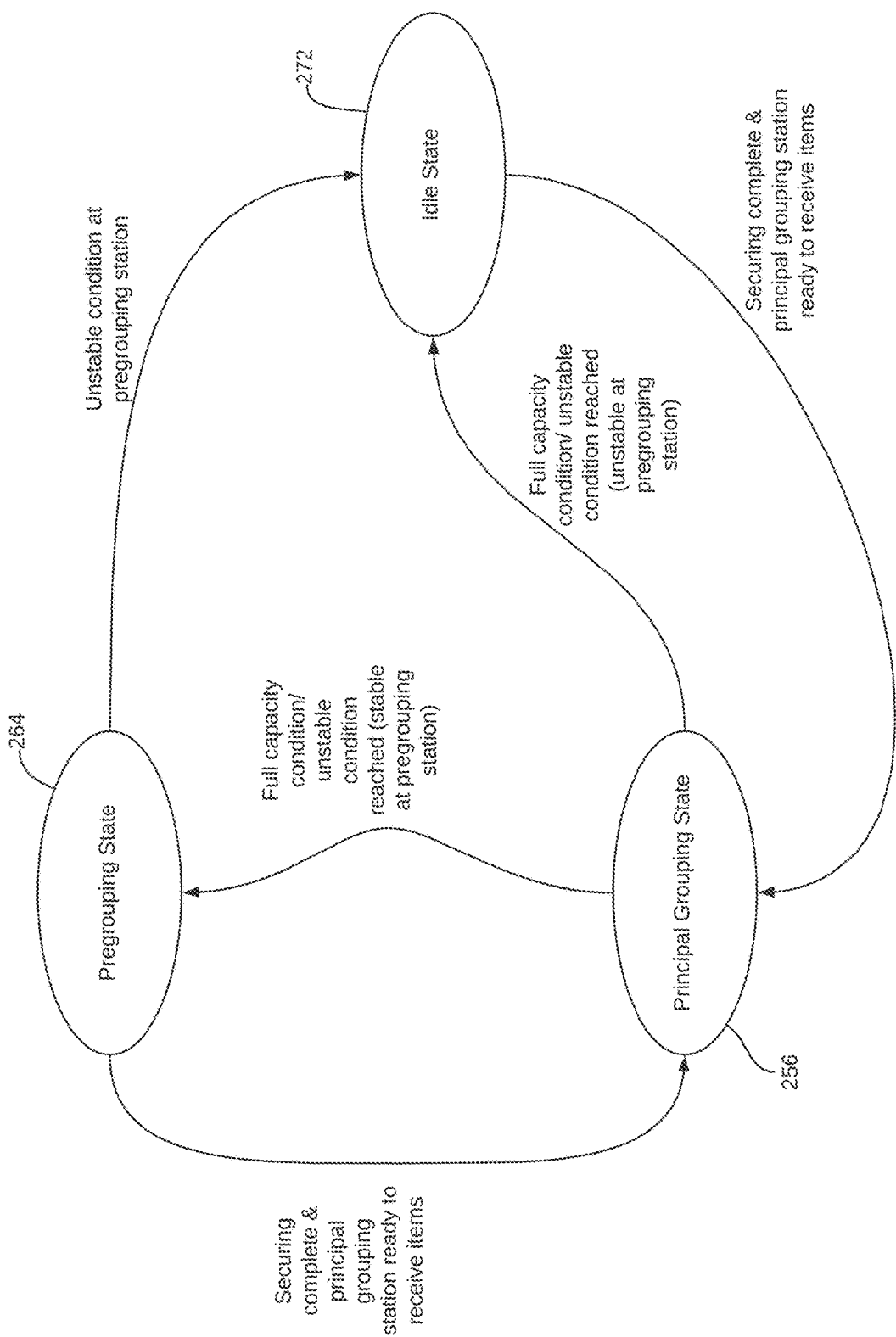
FIG. 15 illustrates a state diagram showing the states of a palletizing robot according to an example embodiment.

Referring now to FIG. 15, therein illustrated is a state diagram showing the states of the palletizing robot 24 according to an example embodiment. The palletizing robot 24 is generally in its principal grouping state 256 to load items onto the pallet located at the principal grouping station 16 (or to group items together at the principal grouping station 16). Upon the group of items at the principal grouping station 16 reaching a full capacity condition or an unstable condition (and the group of items at the pregrouping station 8 not already being in an unstable condition), the palletizing robot 24 enters its pregrouping state 264 to load to-be-grouped items onto the pallet received at the pregrouping station 8 (or to group items together at the pregrouping station 8). Upon the load securing machine 40 completing its securing and a pallet being received at the principal grouping station 16 (or the principal grouping station 16 being ready to receive items), the palletizing robot 24 returns to its principal grouping state.

The palletizing robot 24 enters its idle state 272 whenever it is unable to operate in either its pregrouping state 264 or its principal grouping state 256. More specifically, the palletizing robot 24 enters its idle state from its pregrouping state 264 upon the grouping (or loading) of to-be-grouped items onto the pallet received at the pregrouping station 8 causes the grouped items to reach an unstable condition. The palletizing robot 24 enters its idle state 272 from its principal grouping state 256 upon the grouped items at the principal grouping station 16 reaching a full capacity condition or an unstable condition and the pallet received (or the grouped items) at the pregrouping station 8 already being in an unstable condition. The palletizing robot 24 returns to its principal grouping state 256 upon the securing by the load securing machine 40 being complete and a pallet being received at the principal grouping station 16 (or the principal grouping station being ready to receive items).

Figure 16:
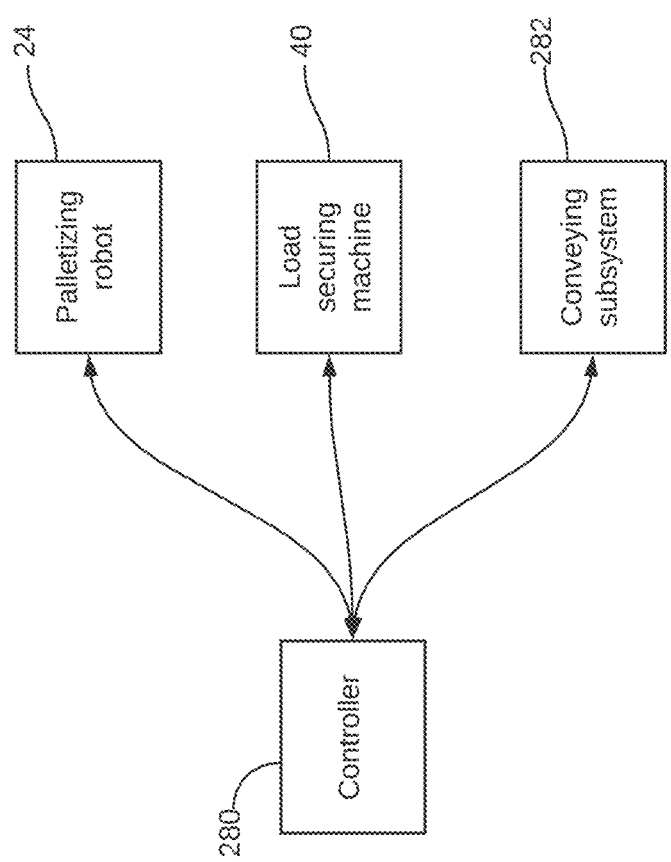
FIG. 16 illustrates a schematic diagram showing the components of the robotic palletizing system according to an example embodiment.

Referring now to FIG. 16, therein illustrated is a schematic diagram of the components the robotic palletizer system 1 according to an example embodiment. The system 1 includes a controller 280 that is operatively connected to the palletizing robot 24 and the load securing machine 40. The controller 280 is configured to transmit control signals to the palletizing robot 24 to cause the palletizing robot 24 to be selectively operated between the pregrouping state and the principal grouping state. The controller 280 is also configured to transmit control signals to the load securing machine 40 to cause the load securing machine 40 to be selectively operated between the securing state and the non-operational state. The controller can be further operatively connected to the conveying subsystem 282 and is configured to transmit control signals thereto to cause the conveying subsystem 282 to transfer the pregrouped set of items from the pregrouping station 8 to the principal grouping station 16 and the grouped and secured items from the principal grouping station 16 to an area downstream thereof.

The controller 280 may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

The controller 280 can be programmed, such as by a human operator, according to the grouping operation to be carried out. The programming may vary according to the type of to-be-grouped items to be palletized (ex: whether items are stable to-be-grouped items, partly stable to-be-grouped items, or unstable to-be-grouped items). For example, the controller 280 can be programmed to define a full capacity condition (ex: the number of items grouped at the principal grouping station that will reach the full capacity condition) and/or an unstable condition at the principal grouping station 16 (ex: the number of items that can be grouped that will reach the unstable condition). The controller 280 can also be programmed to define an unstable condition at the pregrouping station 8 (ex: the number of items grouped at the pregrouping station that will reach the unstable condition). The controller 280 can be further programmed to define the number of loads of items to be grouped at the pregrouping station 8 from the palletizing robot 24 operating in its pregrouping state for each instance of the load securing machine 40 operating in its securing state. In one example embodiment, the controller 280 may be configured to, if a full capacity condition is present at the principal grouping station 16, control the load securing machine 40 to operate in the securing state to secure to-be-grouped items grouped at the principal grouping station 16 and control the palletizing robot 24 to operate in the pregrouping state to group to-be-grouped items at the pregrouping station 8 as the pregrouped set of items. Otherwise, the controller 280 controls the load securing machine 40 to operate in the non-operational state and the palletizing robot 24 in the principal grouping state.

In another example embodiment, the controller 280 may be configured to, if at least one of a full capacity condition and an unstable condition is present at the principal grouping station 16, control the load securing machine to operate in the securing state to secure to-be-grouped items grouped at the principal grouping station 16. Furthermore, during this operation, if a non-unstable condition is present at the pregrouping station 8, the controller 280 controls the palletizing robot 24 to operate in the pregrouping state to group to-be-grouped items at the pregrouping station 8 as the pregrouped set of items. As described elsewhere herein, the load securing machine 40 can be operated differently based on whether the fully capacity condition is present or whether the unstable condition is present. If a non-unstable condition and a non-full capacity condition is present at the principal grouping station 16, the controller 280 controls the load securing machine 40 to operate in the non-operational state and the palletizing robot 24 in the principal grouping state.

Figure 17A:
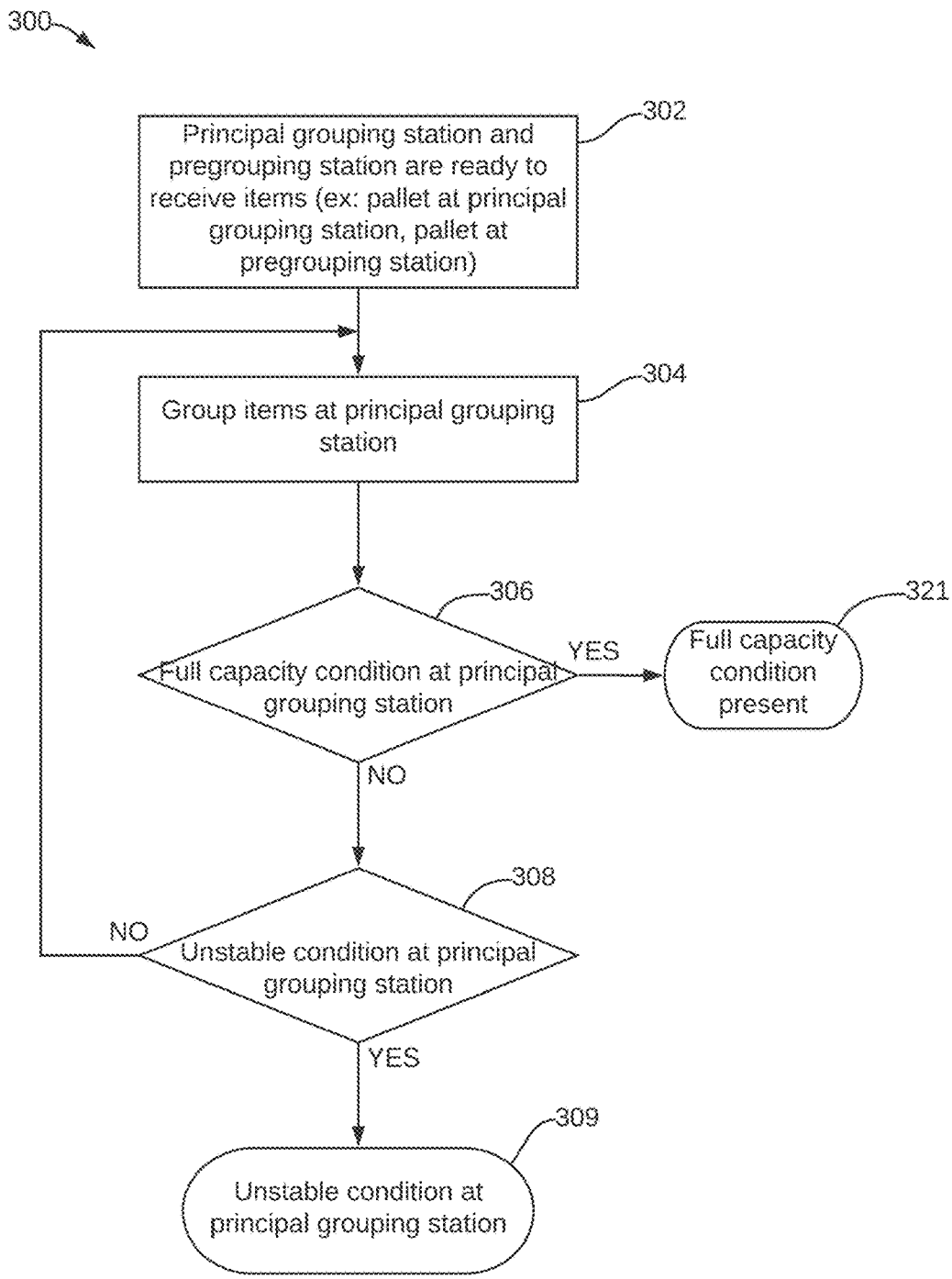
FIGS. 17A to 17C illustrate a flowchart of the operational steps of a method according to an example embodiment for grouping and securing the items together.
Figure 17B:
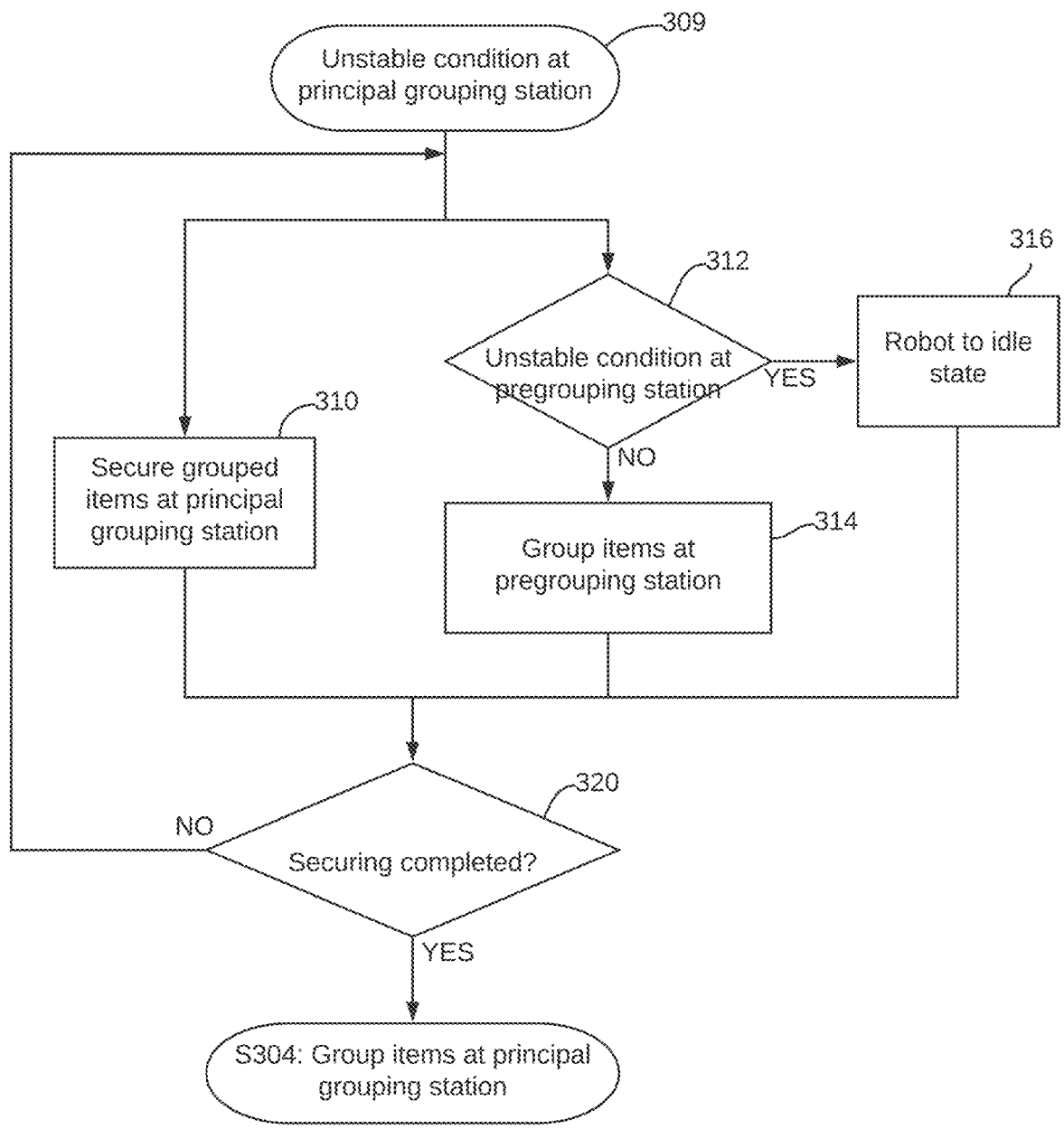
Figure 17C:
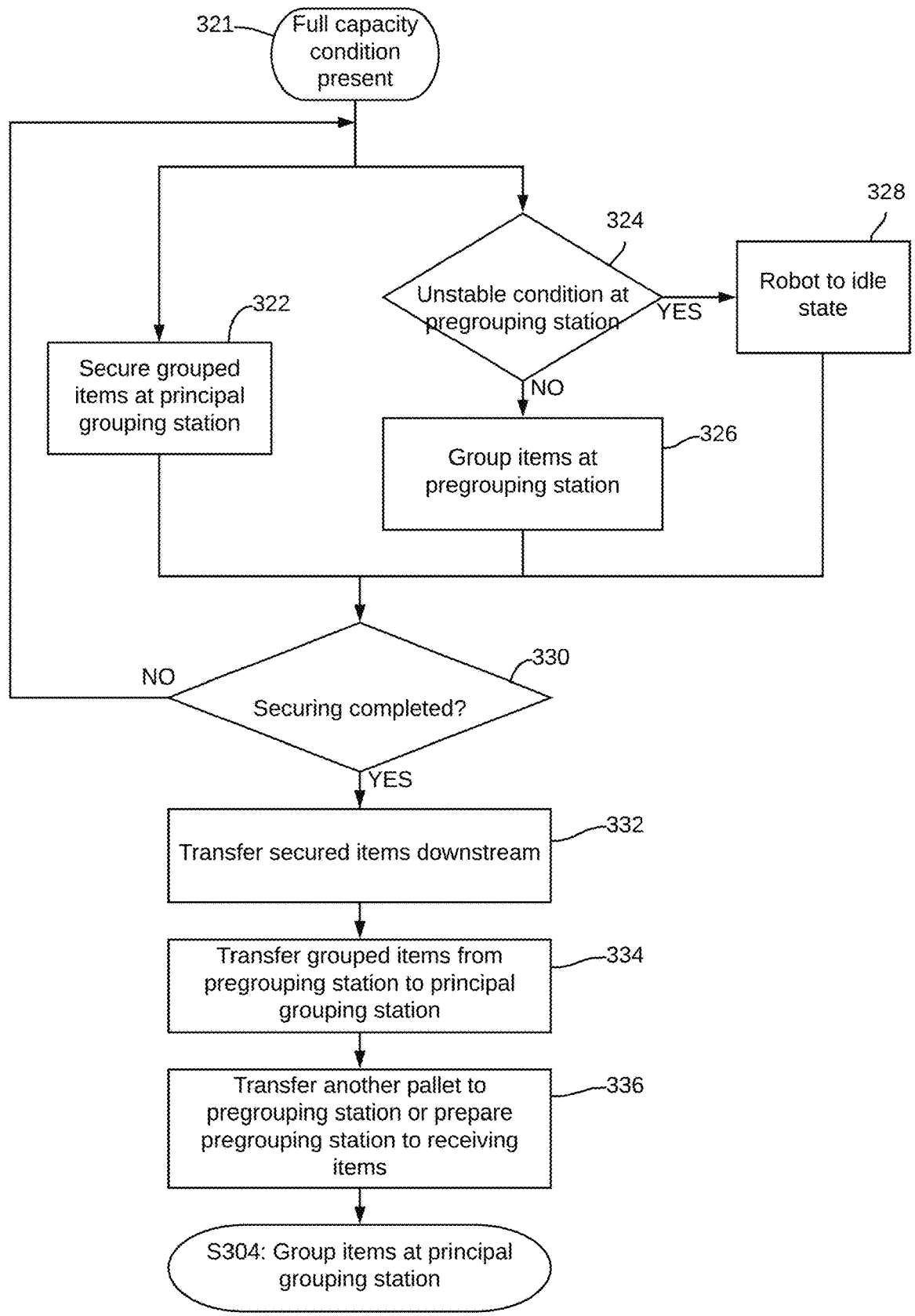

Referring now to FIGS. 17A to 17C, therein illustrates is a flowchart of the operational steps of a method 300 according to an example embodiment for grouping (or loading) and securing the grouped items together, for instance onto a pallet. The controller 280 may be preprogrammed to control the palletizing robot 24, load securing machine 40, and conveying subsystem 282 to carry out steps of the method 300.

At step 302, the principal grouping station and the pregrouping station are ready to receive items, for instance, a pallet is received at the principal grouping station and another pallet is received at the pregrouping station.

At step 304, to-be-grouped items are grouped at the principal grouping station, for instance to-be-grouped items are loaded onto the pallet received at the principal grouping station. If a full capacity condition is not reached at the principal grouping station 16 (step 306: NO) and an unstable condition is also not reached at the principal grouping station 16 (step 308: NO), grouping of items is continued.

If an unstable condition is reached at the principal grouping station 16 (step 308: YES), an unstable condition at the principal grouping station 309 is present and grouped items at the principal grouping station 16 are secured at step 310 (FIG. 16B). At the same time, if an unstable condition has not been reached at the pregrouping station 8 (step 312: NO), grouping of to-be-grouped items at the pregrouping station 8 is carried out at step 314. If an unstable condition is reached at the pregrouping station 8 (step 312: YES), the palletizing robot enters its idle state at step 316 while securing is being carried out during step 310. At step 320, if securing of items received at the principal grouping station 16 is completed, the method returns to step 304 to resume grouping of to-be-grouped items at the principal grouping station.

If the full capacity condition is reached at the principal grouping station 16 (Step 306: YES), a full capacity condition at the principal grouping station 321 is present and grouped items at the principal grouping station 16 are secured at step 322 (FIG. 16C). At the same time, if an unstable condition has not been reached at the pregrouping station 8 (step 324: NO), grouping of to-be-grouped items at the pregrouping station 8 is carried out at step 326. If an unstable condition is reached at the pregrouping station 8 (step 324: YES), the palletizing robot enters its idle state at step 328 while securing is being carried out. At step 330, if securing of grouped items at the principal grouping station 16 is completed (step 330: YES), the grouped and secured items located at the principal grouping station are transferred downstream of the robotic palletizing system 1 at step 332, the grouped items at the pregrouping station 8 are transferred to the principal grouping station 16 at step 334, the pregrouping station 8 is prepared to receive other to-be-grouped items at step 336, for instance another pallet is transferred to the pregrouping station 8, and the method returns to step 304 to resume grouping of to-be-grouped items at the principal grouping station 16.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

It will be appreciated that the methods described herein may be performed in the described order, or in any suitable order.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A robotic palletizing method comprising:
selectively operating a palletizing robot between at least a pregrouping state, in which the palletizing robot groups to-be-grouped items at a pregrouping station, and a principal grouping state, in which the palletizing robot groups to-be-grouped items at a principal grouping station; and selectively operating a load securing machine between a securing state, in which the load securing machine at least partially secures to-be-grouped items grouped at the principal grouping station, and a non-operational state, the method further comprising operating the palletizing robot in the pregrouping state during at least a portion of a time interval during which the load securing machine is operating in the securing state to secure the to-be-grouped items grouped at the principal grouping station.

2. The method of claim 1, further comprising operating the palletizing robot in the principal grouping state when the load securing machine is in the non-operational state.

3. The method of claim 1, wherein the pregrouping station corresponds to a first location at which the palletizing robot is operable to group to-be-grouped items while operating in the pregrouping state; and
wherein the principal grouping station corresponds to a second location at which the palletizing robot is operable to group to-be-grouped items while operating in the principal grouping state, with the first location being horizontally spaced-apart from the second location, wherein the pregrouping station and the principal grouping station are simultaneously within reach of the palletizing robot.

4. The method of claim 1, wherein items are grouped at the pregrouping station as a pregrouped set from the palletizing robot operating in the pregrouping state; and
wherein the method further comprises:
if the to-be-grouped items grouped at the principal grouping station are in a full capacity condition and secured, removing the to-be-grouped items from the principal grouping station and transferring the pregrouped set from the pregrouping station to the principal grouping station; and then
operating the palletizing robot in the principal grouping state to group a principal set of to-be-grouped items at the principal grouping station following the transfer to the principal grouping station.

5. The method of claim 4, further comprising securing the pregrouped set transferred to the principal grouping station before operating the palletizing robot in the principal grouping state to group to-be-grouped items over the pregrouped set.

6. The method of claim 1, further comprising:
if a full capacity condition at the principal grouping station is not reached, operating the palletizing robot in the principal grouping state;
if the full capacity condition at the principal grouping station is reached, operating the load securing machine in the securing state until the to-be-grouped items grouped at the principal grouping station have been secured; and
while the load securing machine operates in the securing state, operating the palletizing robot in the pregrouping state.

7. The method of claim 6, wherein items are grouped at the pregrouping station as a pregrouped set from the palletizing robot operating in the pregrouping state; the method further comprising: upon completing the securing of the items grouped at the principal grouping station:
transferring the secured grouped items from the principal grouping station to an area downstream of the principal grouping station;
transferring the pregrouped set of items from the pregrouping station to the principal grouping station; and
operating the palletizing robot in the principal grouping state to group a principal set of items at the principal grouping station following the transfer of the pregrouped set of items from the pregrouping station to the principal grouping station.

8. The method of claim 1, further comprising:
if at least one of a full capacity condition and an unstable condition at the principal grouping station is not reached, operating the palletizing robot in the principal grouping state;
if at least one of the full capacity condition and the unstable condition at the principal grouping station is reached, operating the load securing machine in the securing state until the to-be-grouped items grouped at the principal grouping station have been secured; and
while the load securing machine operates in the securing state and if an unstable condition at the pregrouping station is not reached, operating the palletizing robot in the pregrouping state whereby to-be-grouped items are grouped at the pregrouping station as a pregrouped set of items; otherwise, configuring the palletizing robot in an idle state.

9. The method of claim 8, further comprising: if the unstable condition at the principal grouping station is reached and following operating the load securing machine in the load securing state; operating the palletizing robot in the principal grouping state to group additional items at the principal grouping station.

10. The method of claim 8, further comprising: if the full capacity condition at the principal grouping station is reached, the load securing machine operates in the load securing state and the palletizing robot operates in the pregrouping state, whereby additional to-be-grouped items are grouped at the pregrouping station as part of the pregrouped set of items; and
wherein upon completing the securing of the items grouped at the principal grouping station following reaching the full capacity condition:
transferring the secured grouped items from the principal grouping station to an area downstream of the principal grouping station;
transferring the pregrouped set of items from the pregrouping station to the principal grouping station; and
operating the palletizing robot in the principal grouping state to group a principal set of items at the principal grouping station following the transfer of the pregrouped set of items from the pregrouping station to the principal grouping station.

11. The method of claim 10, further comprising: if the unstable condition at the pregrouping station is reached and following transfer of the pregrouped set from the pregrouping station to the principal grouping station, operating the load securing machine in the securing state prior to further operating the palletizing robot in the principal grouping state, and simultaneously, operating the palletizing robot in the pregrouping state to group to-be-grouped at the pregrouping station while the load securing machine operates in the securing state.

12. The robotic palletizing method of claim 1, further comprising:
receiving a pallet at the principal grouping station;
receiving another pallet at the pregrouping station; and
wherein, in the pregrouping state, the palletizing robot groups to-be-grouped items onto the pallet received at the pregrouping station;
wherein, in the principal grouping state, the palletizing robot groups to-be-grouped items onto the pallet received at the principal grouping station; and
transferring the pallet received at the pregrouping station, after having a pregrouped set of to-be-grouped items grouped thereon, from the pregrouping station to the principal grouping station; and then
operating the palletizing robot in the principal grouping state to group a principal set of to-be-grouped items onto the pallet following the transfer to the principal grouping station.

13. The method of claim 12, further comprising operating the load securing machine in the securing state after transfer of the pallet having the pregrouped set of to-be-grouped items grouped thereon to the principal grouping station prior to further operating the palletizing robot in the principal grouping state; and
simultaneously, operating the palletizing robot in the pregrouping state to grouped to-be-grouped items onto another pallet received at the pregrouping station while the load securing machine operates in the securing state.

14. The method of claim 13, further comprising operating the load securing machine in the securing state after completing grouping of the principal set of to-be-grouped items; and simultaneously operating the palletizing robot in the pregrouping state to group to-be-grouped items onto another pallet received at the pregrouping station while the load securing machine operates in the securing state.

15. A robotic palletizer system comprising:
a pregrouping station;
a principal grouping station;
a palletizing robot selectively operable in a pregrouping state, in which the palletizing robot groups to-be-grouped items at the pregrouping station as a pregrouped set of to-be-grouped items, and a principal grouping state, in which the palletizing robot groups to-be-grouped items at the principal grouping station;
a pregrouped set transfer assembly configured to transfer the pregrouped set of to-be-grouped items from the pregrouping station to the principal grouping station;
a load securing machine selectively operable in a securing state, in which the load securing machine at least partially secures the to-be-grouped items grouped together at the principal grouping station, and a non-operational state; and a controller operatively connected to the palletizing robot, to the pregrouped set transfer assembly, and the load securing machine and being configured to transmit control signals to the palletizing robot, the pregrouped set transfer assembly, and the load securing machine to cause the palletizing robot to be selectively operated between the pregrouping state and the principal grouping state and to cause the load securing machine to be selectively operated between the securing state and the non-operational state.

16. The robotic palletizer system of claim 15, wherein the palletizing robot is configured to operate in the principal grouping state when the load securing machine is operating in the non-operational state; and wherein the palletizing robot is configured to operate in the pregrouping state during at least a portion of a time interval during which the load securing machine is operating in the securing state to secure the to-be-grouped items grouped at the principal grouping station.

17. The robotic palletizer system of claim 15, wherein the pregrouping station corresponds to a first location at which the palletizing robot is operable to group to-be-grouped items while operating in the pregrouping state; and wherein the principal grouping station corresponds to a second location at which the palletizing robot is operable to group to-be-grouped items while operating in the principal grouping state, with the first location being horizontally spaced-apart from the second location.

18. The robotic palletizer system of claim 15, wherein the pregrouped set transfer assembly comprises a conveyor operable for transferring the pregrouped set of to-be-grouped items from the pregrouping station to the principal grouping station.

19. The robotic palletizer system of claim 18, further comprising a principal set transfer assembly configured to transfer to-be-grouped items grouped and secured at the principal grouping station from the principal grouping station to an area downstream of the principal grouping station.

20. The robotic palletizer system of claim 19, wherein the principal set transfer assembly comprises a conveyor operable for transferring the secured to-be-grouped items from the principal grouping station to the area downstream of the principal grouping station.

21. The robotic palletizer system of claim 15, wherein the controller is configured to:

if a full capacity condition is present at the principal grouping station, control the load securing machine to operate in the securing state to secure to-be-grouped items grouped at the principal grouping station and control the palletizing robot to operate in the pregrouping state to group to-be-grouped items at the pregrouping station as the pregrouped set of items; and otherwise, control the load securing machine to operate in the non-operational state and the palletizing robot to operate in the principal grouping state.

22. The robotic palletizer system of claim 15, wherein the controller is configured to:

if at least one of a full capacity condition and an unstable condition is present at the principal grouping station, control the load securing machine to operate in the securing state to secure to-be-grouped items grouped at the principal grouping station; and, if a non-unstable condition is present at the pregrouping station, control the palletizing robot to operate in the pregrouping state to group to-be-grouped items at the pregrouping station as the pregrouped set of items; and if a non-unstable condition and a non-full capacity condition is present at the principal grouping station, control the load securing machine to operate in the non-operational state and the palletizing robot to operate in the principal grouping state.

23. The robotic palletizer system of claim 15:

wherein, in the pregrouping state, the palletizing robot groups to-be-grouped items onto a pallet received at the pregrouping station; and wherein, in the principal grouping state, the palletizing robot groups to-be-grouped items onto a pallet received at the principal grouping station.

24. The robotic palletizer system of claim 23, further comprising a conveyor operable for transferring the pallet received at the pregrouping station to the principal grouping station.

25. The robotic palletizer system of claim 24, wherein the palletizing robot is operable to group the pregrouped set of to-be-grouped items onto the pallet received at the pregrouping pallet; and wherein the palletizing robot is further operable to add additional ones of the to-be-grouped items onto the pallet following transfer thereof to the principal grouping station.

26. The robotic palletizer system of claim 25, wherein the load securing machine is configured to operate in the securing state after transfer of the pallet having the pregrouped set of to-be-grouped items grouped thereon to the principal grouping station prior to further operating the palletizing robot in the principal grouping state; and wherein the palletizing robot is configured to operate in the pregrouping state to group to-be-grouped items onto another pallet received at the pregrouping station while the load securing machine operates in the securing state.

27. The robotic palletizer system of claim 25, wherein the load securing machine is configured to operate in the securing state after completing adding additional ones of the to-be-grouped items; and wherein the palletizing robot is configured to operate in the pregrouping state to group to-be-grouped items onto another pallet received at the pregrouping station while the load securing machine operates in the securing state.

28. A robotic palletizing method comprising:

selectively operating a palletizing robot between at least a pregrouping state, in which the palletizing robot groups to-be-grouped items at a pregrouping station as a pregrouped set, and a principal grouping state, in which the palletizing robot groups to-be-grouped items at a principal grouping station;

selectively operating a load securing machine between a securing state, in which the load securing machine at least partially secures to-be-grouped items grouped at the principal grouping station, and a non-operational state; and if the to-be-grouped items grouped at the principal grouping station are in a full capacity condition and secured, removing the to-be-grouped items from the principal grouping station and transferring the pregrouped set from the pregrouping station to the principal grouping station.

29. The method of claim 28, further comprising:
- if the full capacity condition at the principal grouping station is not reached, operating the palletizing robot in the principal grouping state;
- if the full capacity condition at the principal grouping station is reached, operating the load securing machine in the securing state until the to-be-grouped items grouped at the principal grouping station have been secured; and
- while the load securing machine operates in the securing state, operating the palletizing robot in the pregrouping state.

* * * * *